(12) United States Patent
Damnjanovic et al.

(10) Patent No.: US 11,115,903 B2
(45) Date of Patent: Sep. 7, 2021

(54) SYSTEM INFORMATION DELIVERY

(71) Applicant: QUALCOMM Incorporated, San Diego, CA (US)

(72) Inventors: Aleksandar Damnjanovic, Del Mar, CA (US); Karl Georg Hampel, Hoboken, NJ (US); Gavin Bernard Horn, La Jolla, CA (US); Keiichi Kubota, Tokyo (JP); Ravi Agarwal, San Diego, CA (US); Peng Cheng, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/467,029

(22) PCT Filed: Oct. 26, 2017

(86) PCT No.: PCT/CN2017/107785
§ 371 (c)(1),
(2) Date: Jun. 5, 2019

(87) PCT Pub. No.: WO2018/103470
PCT Pub. Date: Jun. 14, 2018

(65) Prior Publication Data
US 2019/0394708 A1    Dec. 26, 2019

Related U.S. Application Data

(63) Continuation of application No. PCT/CN2017/107785, filed on Oct. 26, 2017.

(30) Foreign Application Priority Data

Dec. 8, 2016 (WO) ................ PCT/CN2016/108987

(51) Int. Cl.
H04W 48/10 (2009.01)
H04W 36/00 (2009.01)
(Continued)

(52) U.S. Cl.
CPC ..... *H04W 48/10* (2013.01); *H04W 36/00837* (2018.08); *H04W 36/24* (2013.01);
(Continued)

(58) Field of Classification Search
CPC ............... H04W 72/042; H04W 36/24; H04W 72/0453
See application file for complete search history.

(56) References Cited

U.S. PATENT DOCUMENTS 8,724,563 B2  5/2014 Yoo et al.
9,241,287 B2  1/2016 Montojo et al.
(Continued)

FOREIGN PATENT DOCUMENTS

CN  103181203 A  6/2013
CN  103763070 A  4/2014
(Continued)

OTHER PUBLICATIONS

International Search Report and Written Opinion—PCT/CN2016/108987—ISA/EPO—dated Jul. 27, 2017.
(Continued)

*Primary Examiner* — Raj Jain
(74) *Attorney, Agent, or Firm* — QUALCOMM Incorporated

(57) ABSTRACT

Various aspects of the disclosure relate to delivering a limited amount of system information. For example, the delivery of system information may be divided into broadcasting a limited amount of the system information and using unicast signaling for delivery of the remaining system information. In some aspects, the delivery of a limited amount of system information may involve broadcasting a
(Continued)

compressed PLMN ID list (e.g., broadcasting indications of PLMNs). In some aspects, the delivery of a limited amount of system information may involve broadcasting an indication of the version of system information that is valid for a cell. In some aspects, the delivery of a limited amount of system information may involve broadcasting multiple configurations of system information along with indications of each configuration. In some aspects, the delivery of a limited amount of system information may involve broadcasting compressed non-cell-related system information.

14 Claims, 21 Drawing Sheets

(51) Int. Cl.
*H04W 72/00* (2009.01)
*H04W 36/24* (2009.01)
*H04W 72/04* (2009.01)
*H04W 84/04* (2009.01)

(52) U.S. Cl.
CPC ....... *H04W 72/005* (2013.01); *H04W 72/042* (2013.01); *H04W 84/042* (2013.01)

(56) References Cited

U.S. PATENT DOCUMENTS

| | | | | |
|---|---|---|---|---|
| 10,165,428 | B2* | 12/2018 | Arzelier | H04W 4/90 |
| 2009/0316603 | A1* | 12/2009 | Amerga | H04W 48/08 |
| | | | | 370/254 |
| 2014/0295909 | A1* | 10/2014 | Ouchi | H04W 52/40 |
| | | | | 455/522 |
| 2014/0361954 | A1* | 12/2014 | Epstein | H04M 7/0027 |
| | | | | 345/2.3 |
| 2015/0223267 | A1 | 8/2015 | Damnjanovic et al. | |
| 2015/0327228 | A1* | 11/2015 | Pelletier | H04W 74/0808 |
| | | | | 370/329 |
| 2016/0353510 | A1* | 12/2016 | Zhang | H04L 43/16 |
| 2018/0192344 | A1* | 7/2018 | Feng | H04W 72/042 |
| 2019/0394708 | A1* | 12/2019 | Damnjanovic | H04W 36/00837 |

FOREIGN PATENT DOCUMENTS

| | | |
|---|---|---|
| CN | 105101455 A | 11/2015 |
| KR | 20070079700 A | 8/2007 |
| WO | 2011025772 A1 | 3/2011 |
| WO | 2013040221 A2 | 3/2013 |
| WO | 2016107600 A1 | 7/2016 |

OTHER PUBLICATIONS

International Search Report and Written Opinion—PCT/CN2017/107785—ISA/EPO—dated Jan. 29, 2018.
Huawei et al., "Delivery of System Information in NR", 3GPP Draft; R2-165026, 3rd Generation Partnership Project (3GPP), Mobile Competence Centre; 650, Route Des Lucioles; F-06921 Sophia-Antipolis Cedex, France, vol. RAN WG2, No. Gothenburg, Sweden; Aug. 22, 2016-Aug. 26, 2016, Aug. 21, 2016 (Aug. 21, 2016), XP051126666, 6 Pages, Retrieved from the Internet: URL:http://www.3gpp.org/ftp/Meetings_3GPP_SYNC/RAN2/Docs/ [retrieved on Aug. 21, 2016], sections 2.2 and 2.3.
Intel Corporation: "System Information Acquisition Procedure", 3GPP Draft; R2-168529, 3rd Generation Partnership Project (3GPP), Mobile Competence Centre; 650, Route Des Lucioles; F-06921 Sophia-Antipolis Cedex; France, vol. RAN WG2, No. Reno, USA; Nov. 14, 2016-Nov. 18, 2016, Nov. 13, 2016 (Nov. 13, 2016), XP051178110, 4 Pages, Retrieved from the Internet: URL:http://www.3gpp.org/ftp/Meetings_3GPP_SYNC/RAN2/Docs/ [retrieved on Nov. 13, 2016], sections 2.1-2.3.
Samsung: "Contents of Minimum System Information", 3GPP Draft; R2-168152_NR_MIN_SI_FINAL_UPDATE, 3rd Generation Partnership Project (3GPP), Mobile Competence Centre ; 650, Route Des Lucioles; F-06921 Sophia-Antipolis Cedex ; France, vol. RAN WG2, No. Reno, Nevada, USA; Nov. 14, 2016-Nov. 18, 2016, Nov. 13, 2016 (Nov. 13, 2016), XP051177837, 4 Pages, Retrieved from the Internet: URL:http://www.3gpp.org/ftp/Meetings_3GPP_SYNC/RAN2/Docs/ [retrieved on Nov. 13, 2016], section 2.1.
Samsung: "System Information Signalling Design in NR", 3GPP Draft; R2-164693_System Information Signaling Design in NR, 3rd Generation Partnership Project (3GPP), Mobile Competence Centre; 650, Route Des Lucioles; F-06921 Sophia-Antipolis Cedex; France, vol. RAN WG2, No. Gothenburg, Sweden; Aug. 22, 2016-Aug. 26, 2016, Aug. 21, 2016 (Aug. 21, 2016), XP051126466, 6 Pages, Retrieved from the Internet: URL:http://www.3gpp.org/ftp/Meetings_3GPP_SYNC/RAN2/Docs/ [retrieved on Aug. 21, 2016], section 2.
Supplementary European Search Report—EP17877996—Search Authority—Munich—dated Jun. 2, 2020.

* cited by examiner

SYSTEM INFORMATION DELIVERY

CROSS-REFERENCE TO RELATED APPLICATION(S)

This application is the U.S. national stage of PCT patent application number PCT/CN2017/107785 filed on Oct. 26, 2017, which claims priority to and the benefit of PCT patent application number PCT/CN2016/108987 filed on Dec. 8, 2016, the content of each of which is incorporated herein by reference.

INTRODUCTION

Various aspects described herein relate to wireless communication and, more particularly but not exclusively, to delivering a limited amount of system information.

In some multiple access wireless communication networks, several devices communicate with a base station. For example, an eNode B may serve several user equipment devices (UEs).

In such a network, system information (SI) may be delivered through broadcast signaling. The system information may be delivered in blocks referred to a system information blocks (SIBs). In some aspects, the size of the system information might not be a limiting factor in terms of system information delivery in the context of the network framework.

In some scenarios, a base station may be equipped with multiple transmit antennas and multiple receive antennas. One example is a millimeter wave (mmW) system where multiple antennas are used for beamforming (e.g., in the range of 30 GHz, 60 GHz, etc.). Such a base station may communicate with other devices in a time-division-multiplexing (TDM) or time-division-duplexing (TDD) manner. For example, the base station may transmit via a first beam to a first device in a first time interval, transmit via a second beam to a second device in a second time interval, and so on.

SUMMARY

The following presents a simplified summary of some aspects of the disclosure to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present various concepts of some aspects of the disclosure in a simplified form as a prelude to the more detailed description that is presented later.

In one aspect, the disclosure provides an apparatus configured for communication that includes a memory device and a processing circuit coupled to the memory device. The processing circuit is configured to: maintain a set of system information comprising a first subset of system information and a second subset of system information; determine at least one indication mapped to at least one configuration of the first subset of system information; broadcast the at least one indication; and send the second subset of system information.

Another aspect of the disclosure provides a method for communication including: maintaining a set of system information comprising a first subset of system information and a second subset of system information; determining at least one indication mapped to at least one configuration of the first subset of system information; broadcasting the at least one indication; and sending the second subset of system information.

Another aspect of the disclosure provides an apparatus configured for communication. The apparatus including: means for maintaining a set of system information comprising a first subset of system information and a second subset of system information; means for determining at least one indication mapped to at least one configuration of the first subset of system information; means for broadcasting the at least one indication; and means for sending the second subset of system information.

Another aspect of the disclosure provides a non-transitory computer-readable medium storing computer-executable code, including code to: maintain a set of system information comprising a first subset of system information and a second subset of system information; determine at least one indication mapped to at least one configuration of the first subset of system information; broadcast the at least one indication; and send the second subset of system information.

In one aspect, the disclosure provides an apparatus configured for communication that includes a memory device and a processing circuit coupled to the memory device. The processing circuit is configured to: maintain a mapping between indications and configurations of a first subset of a set of system information; receive at least one indication; determine, based on the mapping and the received at least one indication, at least one valid configuration of the first subset of system information; and receive a second subset of the set of system information.

Another aspect of the disclosure provides a method for communication including: maintaining a mapping between indications and configurations of a first subset of a set of system information; receiving at least one indication; determining, based on the mapping and the received at least one indication, at least one valid configuration of the first subset of system information; and receiving a second subset of the set of system information.

Another aspect of the disclosure provides an apparatus configured for communication. The apparatus including: means for maintaining a mapping between indications and configurations of a first subset of a set of system information; means for receiving at least one indication; means for determining, based on the mapping and the received at least one indication, at least one valid configuration of the first subset of system information; and means for receiving a second subset of the set of system information.

Another aspect of the disclosure provides a non-transitory computer-readable medium storing computer-executable code, including code to: maintain a mapping between indications and configurations of a first subset of a set of system information; receive at least one indication; determine, based on the mapping and the received at least one indication, at least one valid configuration of the first subset of system information; and receive a second subset of the set of system information.

These and other aspects of the disclosure will become more fully understood upon a review of the detailed description, which follows. Other aspects, features, and implementations of the disclosure will become apparent to those of ordinary skill in the art, upon reviewing the following description of specific implementations of the disclosure in conjunction with the accompanying figures. While features of the disclosure may be discussed relative to certain implementations and figures below, all implementations of the disclosure can include one or more of the advantageous features discussed herein. In other words, while one or more implementations may be discussed as having certain advantageous features, one or more of such features may also be used in accordance with the various implementations of the disclosure discussed herein. In similar fashion, while certain implementations may be discussed below as device, system, or method implementations it should be understood that such implementations can be implemented in various devices, systems, and methods.

BRIEF DESCRIPTION OF THE DRAWINGS

The accompanying drawings are presented to aid in the description of aspects of the disclosure and are provided solely for illustration of the aspects and not limitations thereof.

DETAILED DESCRIPTION

Figure 1:
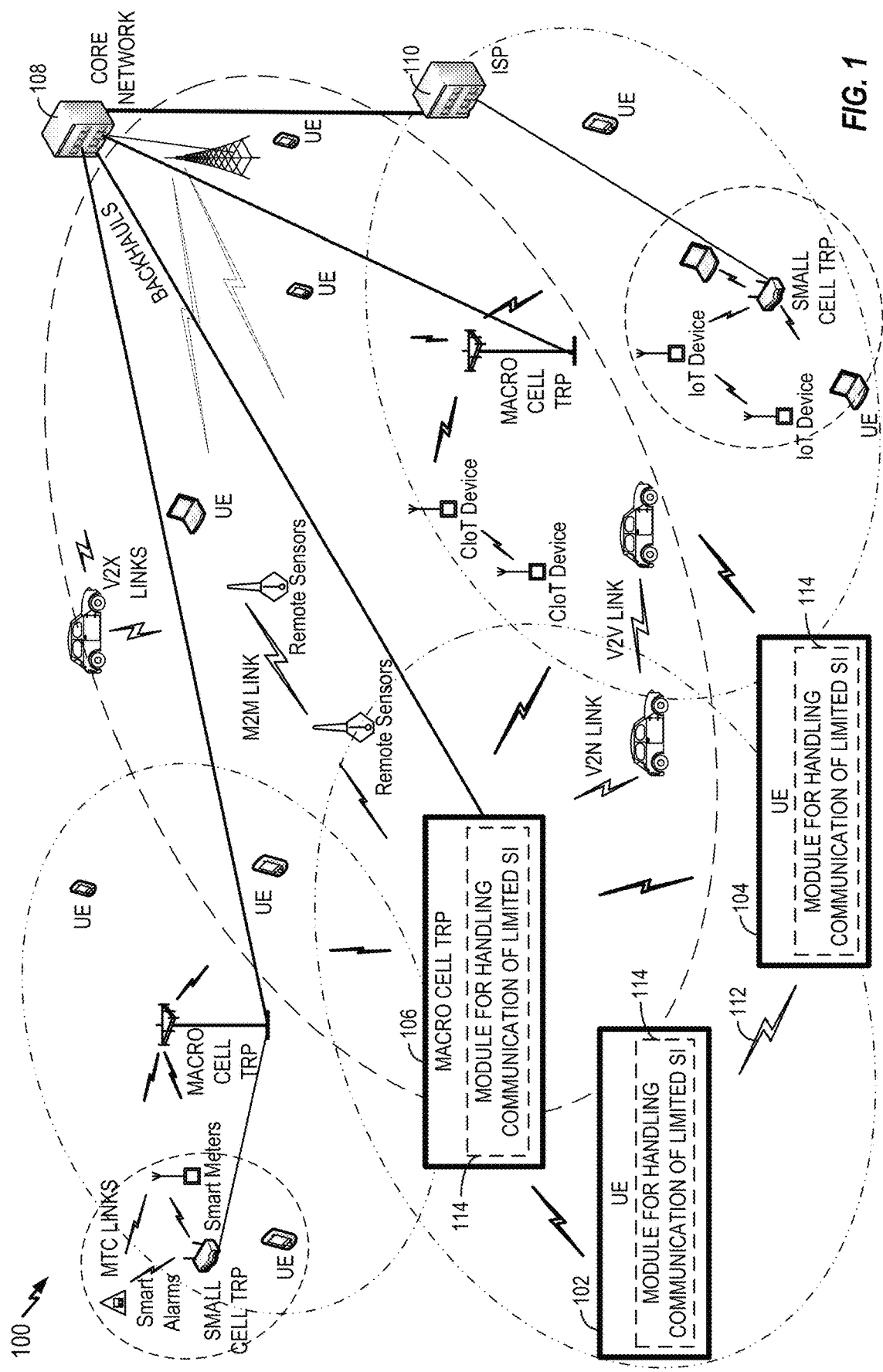
FIG. 1 illustrates an example communication system within which aspects of the disclosure may be implemented.

In some deployments (e.g., a mmW deployment), the link budget for broadcast delivery may be limited. For example, a base station using beamforming may need to conduct a sector sweep to broadcast information over all of the beamforming sectors. This may, in turn, have an impact on the size of information that can be efficiently broadcast. For example, the use of large information blocks may result in an unacceptable delay in the acquisition of system information (e.g., due to soft combining and/or through the use of multiple blocks after the system information is divided into smaller transmission units).

The disclosure relates in some aspects to delivering a limited amount of system information. In some aspects, the delivery of system information may involve: 1) broadcasting (e.g., not using dedicated signaling) a limited amount of the system information; and 2) using dedicated (e.g., unicast) signaling for delivery of the remaining system information (e.g., once a base station determines where a UE is located). For convenience, the limited amount of the system information may be referred to as "minimum SI" in the discussions that follow.

The disclosure thus relates in some aspects to limiting the size of the system information that is broadcast. Alternatively, or in addition, the disclosure relates in some aspects to reducing UE battery consumption when the UE acquires system information.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. Moreover, alternate configurations may be devised without departing from the scope of the disclosure. Additionally, well-known elements will not be described in detail or will be omitted so as not to obscure the relevant details of the disclosure.

The various concepts presented throughout this disclosure may be implemented across a broad variety of telecommunication systems, network architectures, and communication standards. For example, the 3rd Generation Partnership Project (3GPP) is a standards body that defines several wireless communication standards for networks involving the evolved packet system (EPS), frequently referred to as long-term evolution (LTE) networks. Evolved versions of the LTE network, such as a fifth-generation (5G) network, may provide for many different types of services or applications, including but not limited to web browsing, video streaming, VoIP, mission critical applications, multi-hop networks, remote operations with real-time feedback (e.g., tele-surgery), etc. Thus, the teachings herein can be implemented according to various network technologies including, without limitation, 5G technology, fourth generation (4G) technology, third generation (3G) technology, and other network architectures. Thus, various aspects of the disclosure may be extended to networks based on 3rd Generation Partnership Project (3GPP) Long Term Evolution (LTE), LTE-Advanced (LTE-A) (in FDD, TDD, or both modes), Universal Mobile Telecommunications System (UMTS), Global System for Mobile Communications (GSM), Code Division Multiple Access (CDMA), Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. Also, the techniques described herein may be used for a downlink, an uplink, a peer-to-peer link, or some other type of link.

The actual telecommunication standard, network architecture, and/or communication standard used will depend on the specific application and the overall design constraints imposed on the system. For purposes of illustration, the following may describe various aspects in the context of a 5G system and/or an LTE system. It should be appreciated, however, that the teachings herein may be used in other systems as well. Thus, references to functionality in the context of 5G and/or LTE terminology should be understood to be equally applicable to other types of technology, networks, components, signaling, and so on.

Example Communication System

FIG. 1 illustrates an example of a wireless communication system 100 where a user equipment (UE) can communicate with other devices via wireless communication signaling. For example, a first UE 102 and a second UE 104 may communicate with a transmit receive point (TRP) 106 using wireless communication resources managed by the TRP 106 and/or other network components (e.g., a core network 108, an internet service provider (ISP) 110, peer devices, and so on). In some implementations, one or more of the components of the system 100 may communicate with each other directedly via a device-to-device (D2D) link 112 or some other similar type of direct link.

Communication of information between two or more of the components of the system 100 may involve sending system information or the like. For example, the TRP 106 may send system information (SI) to the UE 102 or the UE 104. In accordance with the teachings herein, one or more of the TRP 106, the UE 102, the UE 104, or some other component of the system 100 may include a module for handling communication of limited SI 114.

The components and links of the wireless communication system 100 may take different forms in different implementations. For example, and without limitation, UEs may be cellular devices, Internet of Things (IoT) devices, cellular IoT (CIoT) devices, LTE wireless cellular devices, machine-type communication (MTC) cellular devices, smart alarms, remote sensors, smart phones, mobile phones, smart meters, personal digital assistants (PDAs), personal computers, mesh nodes, and tablet computers.

In some aspects, a TRP may refer to a physical entity that incorporates radio head functionality for a particular physical cell. In some aspects, the TRP may include 5G new radio (NR) functionality with an air interface based on orthogonal frequency division multiplexing (OFDM). NR may support, for example and without limitation, enhanced mobile broadband (eMBB), mission-critical services, and wide-scale deployment of IoT devices. The functionality of a TRP may be similar in one or more aspects to (or incorporated into) the functionality of a CIoT base station (C-BS), a NodeB, an evolved NodeB (eNodeB), radio access network (RAN) access node, a radio network controller (RNC), a base station (BS), a radio base station (RBS), a base station controller (BSC), a base transceiver station (BTS), a transceiver function (TF), a radio transceiver, a radio router, a basic service set (BSS), an extended service set (ESS), a macro cell, a macro node, a Home eNB (HeNB), a femto cell, a femto node, a pico node, or some other suitable entity. In different scenarios (e.g., NR, LTE, etc.), a TRP may be referred to as a gNodeB (gNB), an eNB, a base station, or referenced using other terminology.

Various types of network-to-device links and D2D links may be supported in the wireless communication system 100. For example, D2D links may include, without limitation, machine-to-machine (M2M) links, MTC links, vehicle-to-vehicle (V2V) links, and vehicle-to-anything (V2X) links Network-to-device links may include, without limitation, uplinks (or reverse links), downlinks (or forward links), and vehicle-to-network (V2N) links.

Example Communication Components

Figure 2:
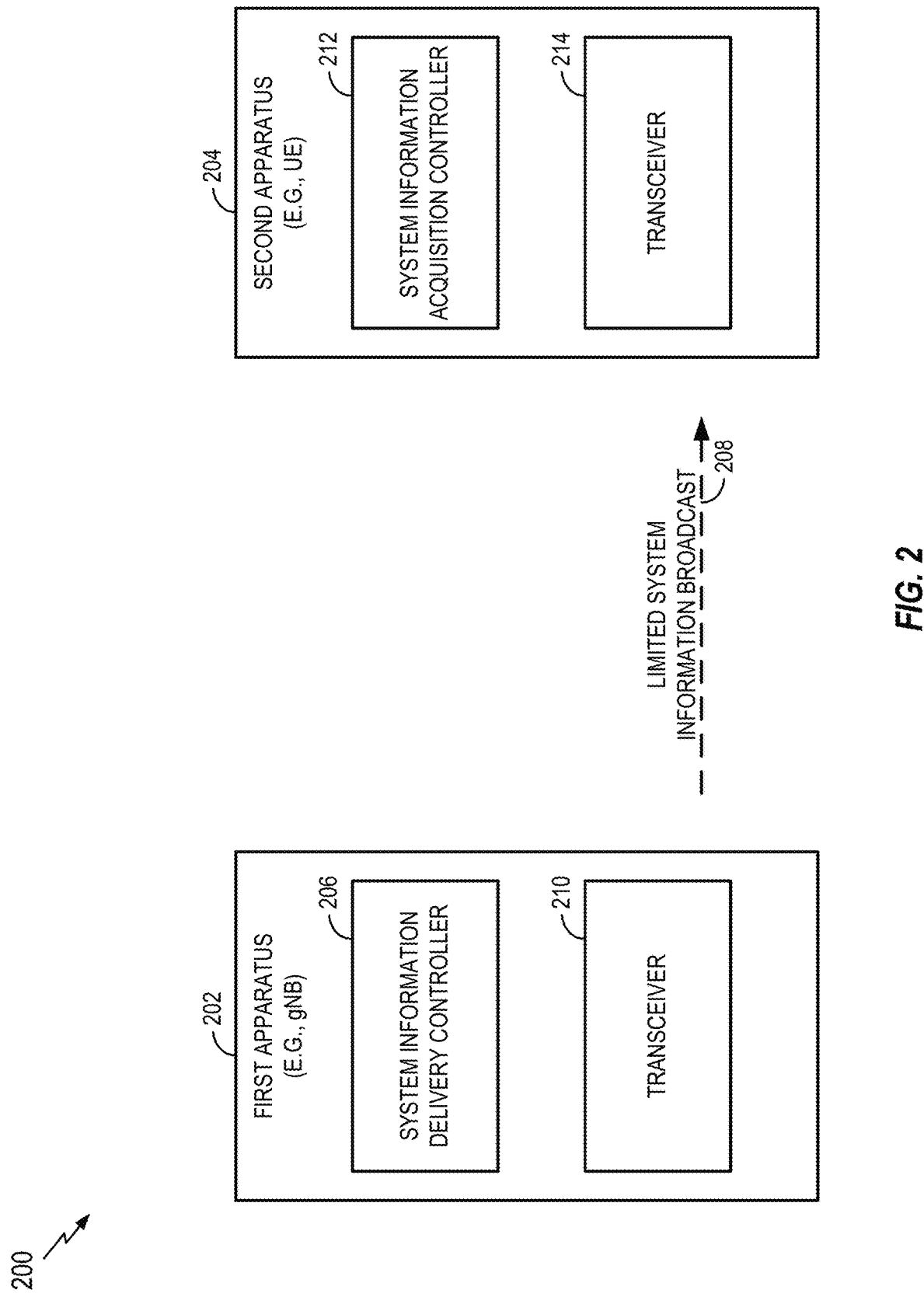
FIG. 2 illustrates an example communication system that limits the amount of system information that is broadcast in accordance with some aspects of the disclosure.

FIG. 2 is a schematic illustration of a wireless communication system 200 that includes a first apparatus 202 (e.g., wireless communication device) and a second apparatus 204 (e.g., wireless communication device) that may use the teachings herein. In some implementations, the first apparatus 202 may correspond to the TRP 106 (e.g., a gNode B (gNB), a transmit receive point, an eNode B, etc.) or some other component of FIG. 1. In some implementations, the second apparatus 204 may correspond to the UE 102, the UE 104, or some other component of FIG. 1.

The first apparatus 202 includes a system information delivery controller 206 for controlling how system information is delivered to the second apparatus 204. For example, in some scenarios, the system information delivery controller 206 sends limited system information 208 (e.g., minimum SI) to the second apparatus 204 via a transceiver 210. Similarly, the second apparatus 204 includes a system information acquisition controller 212 for controlling how the second apparatus 204 acquires system information via a transceiver 214.

The minimum SI may serve several purposes. Several non-limiting examples of these purposes follow. In some aspects, the minimum SI may include information that a UE needs to establish communication with a communication network. In some aspects, the minimum SI may enable a UE to determine a suitable cell and/or how to access a particular cell (e.g., the minimum SI may include information about the PLMN, access class barring, etc.). In some aspects, the minimum SI may provide a cell ID. In some aspects, the minimum SI may provide parameters for cell selection and/or cell reselection. In some aspects, the minimum SI may provide a physical layer configuration for random access. In some aspects, the minimum SI may provide other physical layer configuration parameters that are used to receive paging messaging.

In some implementations, minimum SI may be broadcast via two blocks: a Master Information Block (MIB) and a remaining minimum SI block (RMSI). The MIB may carry a first portion of the minimum SI (e.g., the most important information), while the RMSI may carry the remaining information that makes up the minimum SI. The RMSI may potentially occur less often than the MIB and/or be provided (e.g., sent) in a different manner. In some implementations, the MIB may be mapped to a Physical Broadcast Channel (PBCH). In some implementations, the RMSI may be mapped to a regular data channel.

The MIB may take various forms. The MIB may be used to read other channels. The MIB may be fixed in size. The MIB may potentially be decoded for not only a serving cell, but for neighboring cells too. The MIB may be limited to reduced bandwidth at the center of the carrier. For example, the bandwidth used to send the MIB may be narrower than the bandwidth used to send the RMSI.

In some aspects, the delivery of a limited amount of system information may involve a gNB broadcasting a compressed Public Land Mobile Network (PLMN) identifier (ID) list. A UE that receives this broadcast may then determine, based on the compressed PLMN information (e.g., indicators of PLMNs), at least one PLMN with which the UE may establish communication.

In some aspects, the delivery of a limited amount of system information may involve broadcasting indications of multiple configurations of system information. A UE that receives this broadcast may then determine, based on the indications, at least one valid system information configuration that the UE may use to establish communication.

Compression of PLMN ID List

Figure 3:
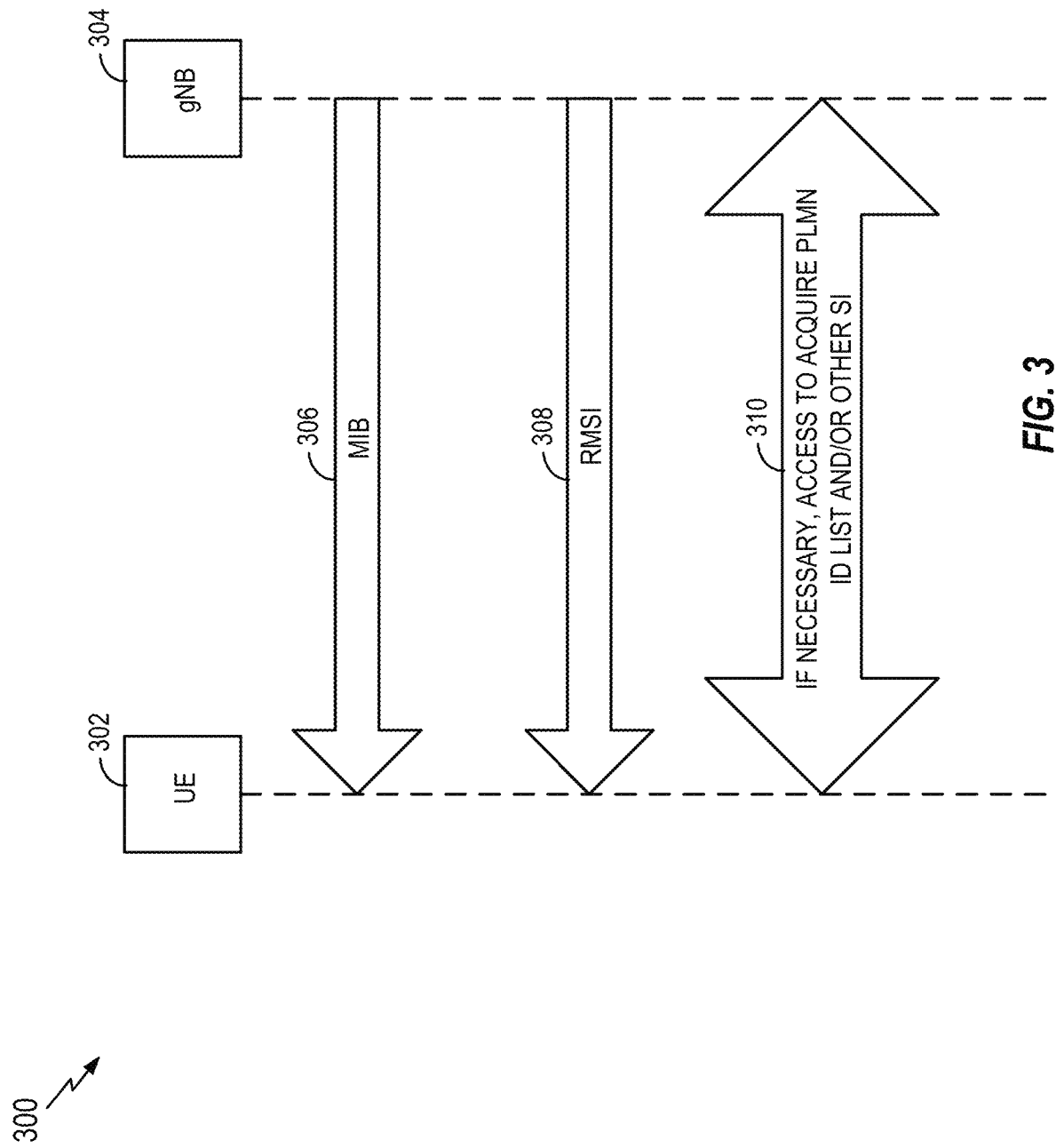
FIG. 3 illustrates an example communication system that communicates a Master Information Block (e.g., including a compressed PLMN ID list) in accordance with some aspects of the disclosure.

The disclosure relates in some aspects to delivering a compressed PLMN ID list. Other minimum SI (e.g., other than the PLMN ID list) may be broadcast uncompressed. FIG. 3 illustrates an example call flow 300 between a UE 302 and a gNB 304 for delivering a compressed PLMN ID list (e.g., via a MIB 306, an RMSI 308, or other signaling). In some implementations, the UE 302 and the gNB 304 may respectively correspond to the second apparatus 204 and the first apparatus 202 of FIG. 2.

In some aspects, instead of broadcasting a PLMN ID list, the network may broadcast a tag (or some other suitable indication). Upon acquiring the minimum SI, the UE 302 may perform a random access 310 (on a RACH) and acquire a list of one or more PLMN IDs and/or other system information and then associate the PLMN ID list with the received tag and the carrier frequency. Alternatively, a UE may obtain the minimum system information in some other way (e.g., from a subscriber identity module).

The tag may be generated in various ways. For example, a tag can be generated by the network as a random number. As another example, the generation of a tag can be standardized. As yet another example, the generation of a tag can be a function of the PLMN ID list. As a further example, the tag can simply take the form of one or more reserved values (e.g., the mobile country code (MCC) and the mobile network code (MNC)) that are used to indicate the PLMN ID list. In some cases, an indicator (e.g., a bit) may be used to indicate that a PLMN ID field includes a tag rather than PLMN IDs.

In some aspects, a UE might not need to perform a RACH procedure again if the UE detects the same tag after acquiring the minimum SI in another cell. Here, since the new cell is using the same tag, the UE may assume that the same minimum SI applies in the new cell. For example, once a UE obtains a full PLMN ID list via a RACH procedure, the UE can determine whether to continue on this frequency (e.g., determine whether the UE is allowed) or select a new frequency. Subsequently, the UE can remember this determination (e.g., by associating the tag with a list of where the user is allowed access or is not allowed access).

In case of a single PLMN ID, the same procedure could apply or the network can simply broadcast the PLMN ID.

Transmission of a Value Tag in a MIB

The disclosure relates in some aspects to transmitting a value tag in a MIB. To minimize battery consumption at the UE, particularly in the RRC_INACTIVE state, (or for other purposes) a UE can recognize that it has valid system information (or a valid subset of the system information) for a given cell by decoding its MIB. For example, a value tag transmitted in the MIB may serve as an early indication of the version of the system information valid for a given cell. A UE that has already visited the cell, that was given system information about the cell from other cells, or that obtained the system information in some other way (e.g., from a subscriber identity module) can thus avoid acquiring the system information again. If the value tag has changed, the UE may acquire the system information again, otherwise, the UE need not reacquire the system information. Thus, in some aspects, a UE may use the value tag to confirm the cell identity and the SI configuration.

Figure 4:
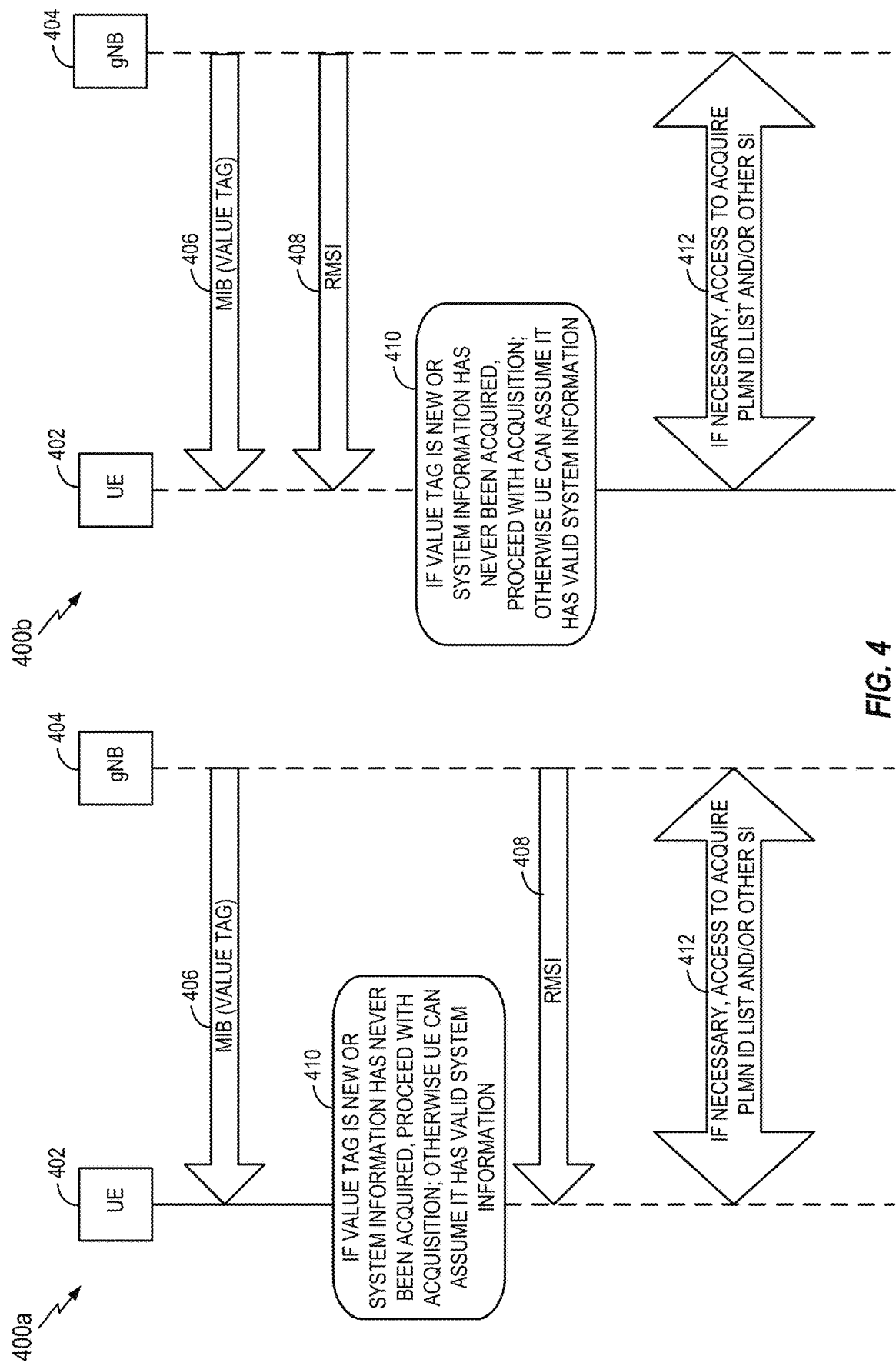
FIG. 4 illustrates an example communication system that communicates a Master Information Block (e.g., including an indication of the version of the valid system information for a cell) in accordance with some aspects of the disclosure.

FIG. 4 illustrates two example call flows between a UE 402 and a gNB 404 where the gNB 404 sends a value tag to the UE 402 via or in conjunction with a MIB 406. In some implementations, the UE 402 and the gNB 404 may respectively correspond to the second apparatus 204 and the first apparatus 202 of FIG. 2. In a first call flow 400a, the value tag covers (e.g., maps to) the RMSI 408. In a second call flow 400b, the value tag does not cover the RMSI 408 (e.g., the UE needs to read a data channel to acquire the RMSI 408). At block 410, if the value tag is new or SI has never been acquired, the UE may proceed with acquisition. Other UEs can assume that they have valid system information. Upon acquiring the minimum SI, the UE 402 may perform a random access 412 (on a RACH) and acquire a list of PLMN IDs and/or other system information (e.g., and then associate the PLMN ID list with the received tag and the carrier frequency).

Indication of Parameter Configuration

The disclosure relates in some aspects to indicating system information configurations. For example, as an alternative to a value tag concept, a gNB may upon initial access provide multiple configurations of the system information to the UE and associate each system information configuration with a configuration tag. The configuration tag could be applicable to configure the number of cells, the zone, the tracking area, the entire PLMN ID, other system information, or any combination thereof.

Figure 5:
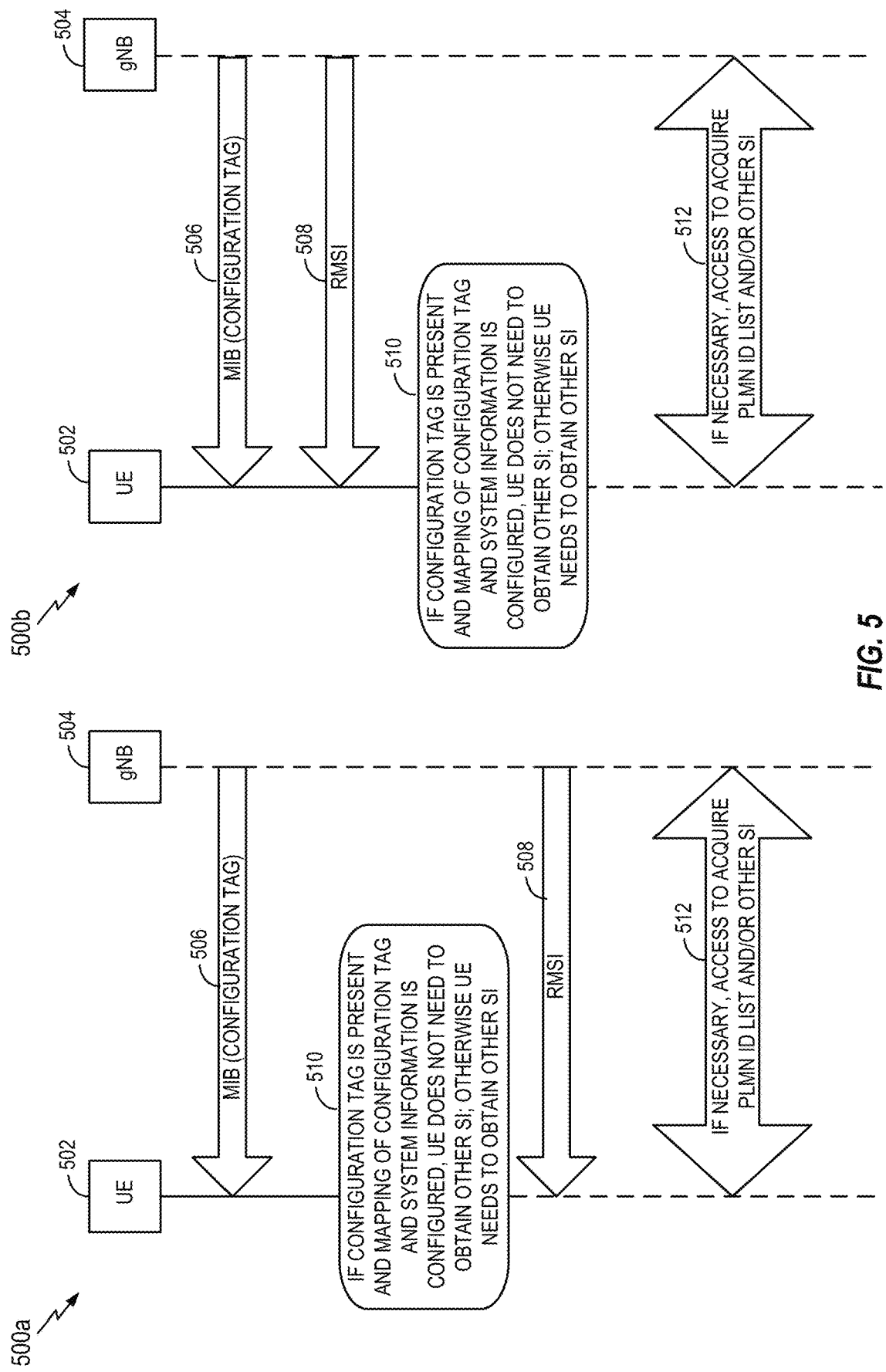
FIG. 5 illustrates an example communication system that communicates a Master Information Block (e.g., including multiple configurations of system information along with identifiers of each configuration) in accordance with some aspects of the disclosure.

FIG. 5 illustrates two example call flows between a UE 502 and a gNB 504 where the gNB 504 sends a configuration tag to the UE 502 via or in conjunction with a MIB 506. In some implementations, the UE 502 and the gNB 504 may respectively correspond to the second apparatus 204 and the first apparatus 202 of FIG. 2. In a first call flow 500a, the configuration tag covers the RMSI 508. In a second call flow 500b, the configuration tag does not cover the RMSI 508 (e.g., the UE needs to read a data channel to acquire the RMSI 508). At block 510, if the configuration tag is new or SI has never been acquired, the UE may proceed with acquisition. Other UEs can assume that they have valid system information. Upon acquiring the minimum SI, the UE 502 may perform a random access 512 (on a RACH) and acquire a list of PLMN IDs and/or other system information (e.g., and then associate the PLMN ID list with the received tag and the carrier frequency).

Compression of Non-Cell-Related System Information

The disclosure relates in some aspects to compressing non-cell-related system information. As one non-limiting example, compression may refer to sending an indication or some other shortened form of the system information.

The system information may include, for example, one or more of the following. All non-cell related parameters (e.g., PLMN ID list, physical configuration, etc.) may be broadcast in a compressed version. All cell-related parameters (e.g., Cell ID, cell barring information, etc.) may be broadcast in an un-compressed version. Uncompressed non-cell related parameters and other SI may be available on demand (e.g., during or after a RACH procedure). The compressed version of SI may hold expiry data. A default physical layer configuration may be specified for on-demand SI retrieval.

An example of a UE procedure follows. When a UE boots or when the cached compressed-SI at the UE has changed or expired, the UE may perform on-demand retrieval of SI. The UE then caches the new compressed SI broadcast. A UE may use a cached physical layer configuration for on-demand retrieval of SI. When a UE boots or when the cached physical layer configuration at the UE expires, the UE may use a default physical layer configuration for on-demand retrieval of SI.

In some aspects, there may be different types (e.g., two types) of configuration information (e.g., for RACH settings). A first type of configuration information may include, for example, standardized configuration information. For example, this information may include a set of values and an index that is standardized so that the UE understands what they are. A second type of configuration information may include, for example, operator-specific configuration information. For example, this information may include specific settings defined by the operator (e.g., based on local configuration).

In some aspects, a cell (e.g., a gNB) may advertise the different types of configuration information. For example, a cell may advertise at least one standardized configuration and then optionally advertise at least one operator-specific configuration.

Example Beamforming System

Figure 6:
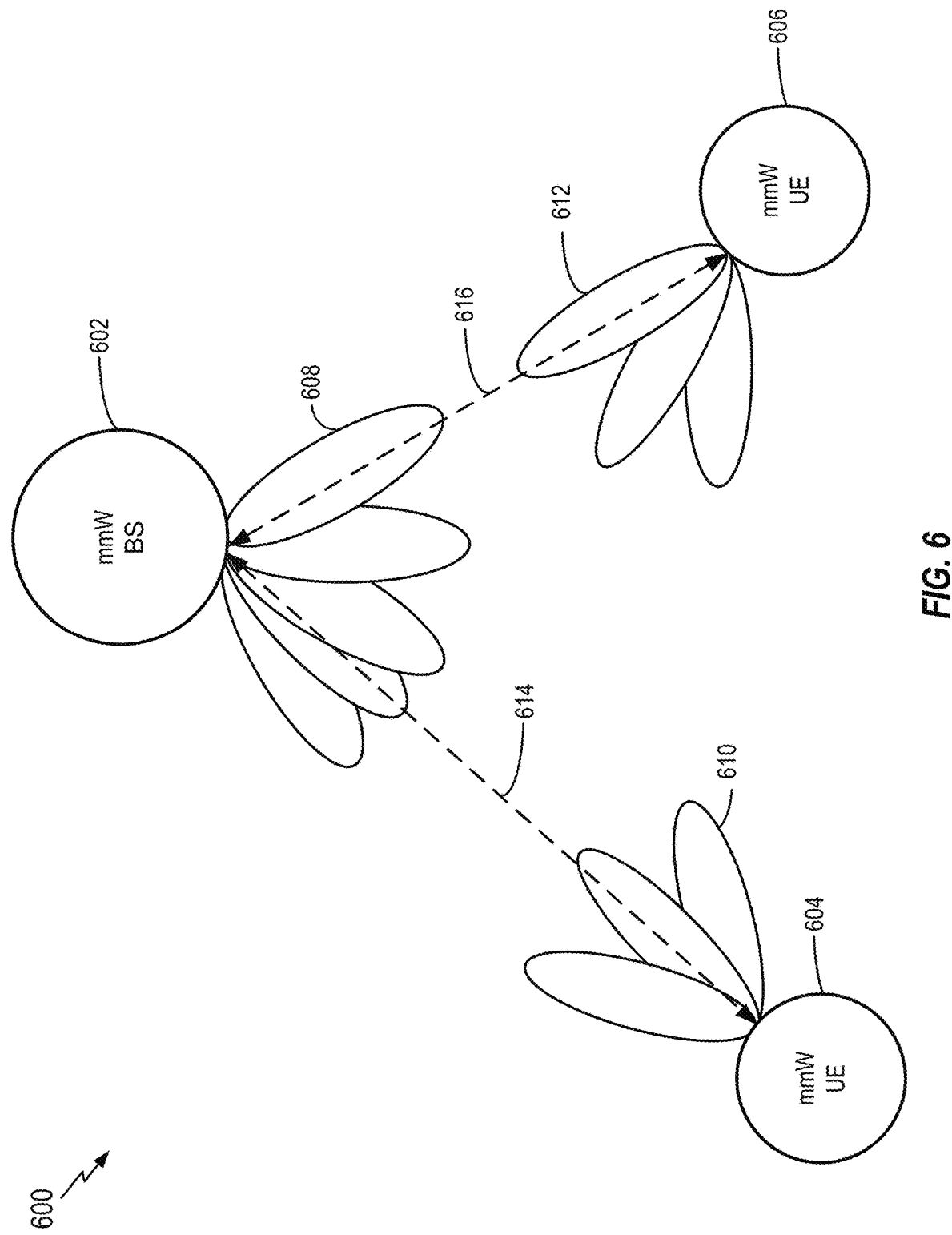
FIG. 6 illustrates an example communication system employing beamforming within which aspects of the disclosure may be implemented.

The teachings herein may be used in an apparatus that uses mmW technology. FIG. 6 illustrates a communication system 600 where a mmW base station (BS) 602 communicates with a first mmW user equipment (UE) 604 and a second mmW UE 606 via different beamforming directions. As indicated by a set of beams 608, the mmW base station 602 may communicate via any one of a plurality of directional beams. As indicated by a set of beams 610, the first mmW UE 604 may communicate via any one of a plurality of directional beams. As indicated by a set of beams 612, the second mmW UE 606 may communicate via any one of a plurality of directional beams. For example, the base station 602 may communicate with the first mmW UE 604 via a first beamforming direction 614 and communicate with the second mmW UE 606 via a second beamforming direction 616. In some implementations, the mmW base station 602 may correspond to the TRP 106 of FIG. 1 or the first apparatus 202 of FIG. 2. In some implementations, the first mmW UE 604 and the second mmW UE 606 may correspond to the UE 102 or the UE 104 of FIG. 1 or the second apparatus 204 of FIG. 2.

First Example Apparatus

Figure 7:
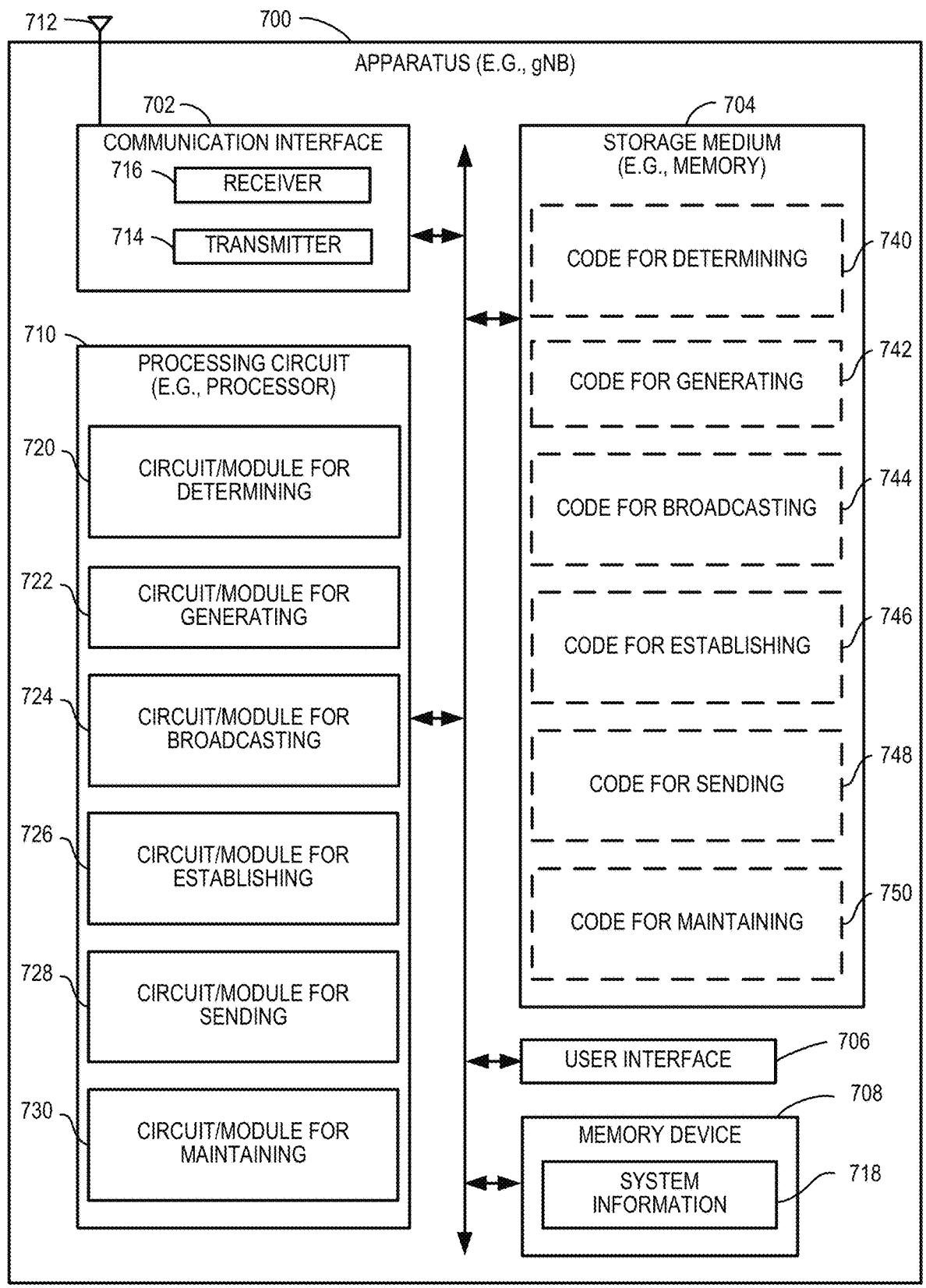
FIG. 7 is a block diagram illustrating an example hardware implementation for an apparatus (e.g., an electronic device) that can support communication in accordance with some aspects of the disclosure.

FIG. 7 illustrates a block diagram of an example hardware implementation of an apparatus 700 configured to communicate according to one or more aspects of the disclosure. The apparatus 700 could embody or be implemented within a gNB, a transmit receive point (TRP), a base station (BS), an eNode B (eNB), a UE, a CPE, or some other type of device that supports wireless communication. In various implementations, the apparatus 700 could embody or be implemented within an access point, an access terminal, or some other type of device. In various implementations, the apparatus 700 could embody or be implemented within a server, a personal computer, a mobile phone, a smart phone, a tablet, a portable computer, a sensor, an alarm, a vehicle, a machine, an entertainment device, a medical device, or any other electronic device having circuitry.

The apparatus 700 includes a communication interface (e.g., at least one transceiver) 702, a storage medium 704, a user interface 706, a memory device (e.g., a memory circuit) 708, and a processing circuit 710 (e.g., at least one processor). In various implementations, the user interface 706 may include one or more of: a keypad, a display, a speaker, a microphone, a touchscreen display, of some other circuitry for receiving an input from or sending an output to a user.

These components can be coupled to and/or placed in electrical communication with one another via a signaling bus or other suitable component, represented generally by the connection lines in FIG. 7. The signaling bus may include any number of interconnecting buses and bridges depending on the specific application of the processing circuit 710 and the overall design constraints. The signaling bus links together various circuits such that each of the communication interface 702, the storage medium 704, the user interface 706, and the memory device 708 are coupled to and/or in electrical communication with the processing circuit 710. The signaling bus may also link various other circuits (not shown) such as timing sources, peripherals, voltage regulators, and power management circuits, which are well known in the art, and therefore, will not be described any further.

The communication interface 702 provides a means for communicating with other apparatuses over a transmission medium. In some implementations, the communication interface 702 includes circuitry and/or programming adapted to facilitate the communication of information bi-directionally with respect to one or more communication devices in a network. In some implementations, the communication interface 702 is adapted to facilitate wireless communication of the apparatus 700. In these implementations, the communication interface 702 may be coupled to one or more antennas 712 as shown in FIG. 7 for wireless communication within a wireless communication system. In some implementations, the communication interface 702 may be configured for wire-based communication. For example, the communication interface 702 could be a bus interface, a send/receive interface, or some other type of signal interface including drivers, buffers, or other circuitry for outputting and/or obtaining signals (e.g., outputting signal from and/or receiving signals into an integrated circuit). The communication interface 702 can be configured with one or more standalone receivers and/or transmitters, as well as one or more transceivers. In the illustrated example, the communication interface 702 includes a transmitter 714 and a receiver 716. The communication interface 702 serves as one example of a means for receiving and/or means transmitting.

The memory device 708 may represent one or more memory devices. As indicated, the memory device 708 may maintain system information 718 along with other information used by the apparatus 700. In some implementations, the memory device 708 and the storage medium 704 are implemented as a common memory component. The memory device 708 may also be used for storing data that is manipulated by the processing circuit 710 or some other component of the apparatus 700.

The storage medium 704 may represent one or more computer-readable, machine-readable, and/or processor-readable devices for storing programming, such as processor executable code or instructions (e.g., software, firmware), electronic data, databases, or other digital information. The storage medium 704 may also be used for storing data that is manipulated by the processing circuit 710 when executing programming. The storage medium 704 may be any available media that can be accessed by a general purpose or special purpose processor, including portable or fixed storage devices, optical storage devices, and various other mediums capable of storing, containing or carrying programming.

By way of example and not limitation, the storage medium 704 may include a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The storage medium 704 may be embodied in an article of manufacture (e.g., a computer program product). By way of example, a computer program product may include a computer-readable medium in packaging materials. In view of the above, in some implementations, the storage medium 704 may be a non-transitory (e.g., tangible) storage medium. For example, the storage medium 704 may be a non-transitory computer-readable medium storing computer-executable code, including code to perform operations as described herein.

The storage medium 704 may be coupled to the processing circuit 710 such that the processing circuit 710 can read information from, and write information to, the storage medium 704. That is, the storage medium 704 can be coupled to the processing circuit 710 so that the storage medium 704 is at least accessible by the processing circuit 710, including examples where at least one storage medium is integral to the processing circuit 710 and/or examples where at least one storage medium is separate from the processing circuit 710 (e.g., resident in the apparatus 700, external to the apparatus 700, distributed across multiple entities, etc.).

Programming stored by the storage medium 704, when executed by the processing circuit 710, causes the processing circuit 710 to perform one or more of the various functions and/or process operations described herein. For example, the storage medium 704 may include operations configured for regulating operations at one or more hardware blocks of the processing circuit 710, as well as to utilize the communication interface 702 for wireless communication utilizing their respective communication protocols.

The processing circuit 710 is generally adapted for processing, including the execution of such programming stored on the storage medium 704. As used herein, the terms "code" or "programming" shall be construed broadly to include without limitation instructions, instruction sets, data, code, code segments, program code, programs, programming, subprograms, software modules, applications, software applications, software packages, routines, subroutines, objects, executables, threads of execution, procedures, functions, etc., whether referred to as software, firmware, middleware, microcode, hardware description language, or otherwise.

The processing circuit 710 is arranged to obtain, process and/or send data, control data access and storage, issue commands, and control other desired operations. The processing circuit 710 may include circuitry configured to implement desired programming provided by appropriate media in at least one example. For example, the processing circuit 710 may be implemented as one or more processors, one or more controllers, and/or other structure configured to execute executable programming Examples of the processing circuit 710 may include a general purpose processor, a digital signal processor (DSP), an application-specific integrated circuit (ASIC), a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 710 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuit 710 are for illustration and other suitable configurations within the scope of the disclosure are also contemplated.

According to one or more aspects of the disclosure, the processing circuit 710 may be adapted to perform any or all of the features, processes, functions, operations and/or routines for any or all of the apparatuses described herein. For example, the processing circuit 710 may be configured to perform any of the steps, functions, and/or processes described with respect to FIGS. 1-6 and 8-12. As used herein, the term "adapted" in relation to the processing circuit 710 may refer to the processing circuit 710 being one or more of configured, employed, implemented, and/or programmed to perform a particular process, function, operation and/or routine according to various features described herein.

The processing circuit 710 may be a specialized processor, such as an application-specific integrated circuit (ASIC) that serves as a means for (e.g., structure for) carrying out any one of the operations described in conjunction with FIGS. 1-6 and 8-12. The processing circuit 710 serves as one example of a means for transmitting and/or a means for receiving. In various implementations, the processing circuit 710 may provide and/or incorporate, at least in part, the functionality described above for the first apparatus 202 (e.g., the system information delivery controller 206) of FIG. 2.

According to at least one example of the apparatus 700, the processing circuit 710 may include one or more of a circuit/module for determining 720, a circuit/module for generating 722, a circuit/module for broadcasting 724, a circuit/module for establishing 726, a circuit/module for sending 728, or a circuit/module for maintaining 730. In various implementations, the circuit/module for determining 720, the circuit/module for generating 722, the circuit/module for broadcasting 724, the circuit/module for establishing 726, the circuit/module for sending 728, or the circuit/module for maintaining 730 may provide and/or incorporate, at least in part, the functionality described above for the first apparatus 202 (e.g., the system information delivery controller 206) of FIG. 2.

As mentioned above, programming stored by the storage medium 704, when executed by the processing circuit 710, causes the processing circuit 710 to perform one or more of the various functions and/or process operations described herein. For example, the programming may cause the processing circuit 710 to perform the various functions, steps, and/or processes described herein with respect to FIGS. 1-6 and 8-12 in various implementations. As shown in FIG. 7, the storage medium 704 may include one or more of code for determining 740, code for generating 742, code for broadcasting 744, code for establishing 746, code for sending 748, or code for maintaining 750. In various implementations, the code for determining 740, the code for generating 742, the code for broadcasting 744, the code for establishing 746, the code for sending 748, or the code for maintaining 750 may be executed or otherwise used to provide the functionality described herein for the circuit/module for determining 720, the circuit/module for generating 722, the circuit/module for broadcasting 724, the circuit/module for establishing 726, the circuit/module for sending 728, or the circuit/module for maintaining 730.

The circuit/module for determining 720 may include circuitry and/or programming (e.g., code for determining 740 stored on the storage medium 704) adapted to perform several functions relating to, for example, determining an indication. In some aspects, the circuit/module for determining 720 may determine whether to broadcast the at least one indication (e.g., instead of broadcasting the first subset of system information). In some aspects, the circuit/module for determining 720 may determine whether a link budget for the apparatus is limited. In some aspects, the circuit/module for determining 720 may determine whether beamforming is used to send system information. In some aspects, the circuit/module for determining 720 (e.g., a means for determining) may correspond to, for example, a processing circuit.

Initially, the circuit/module for determining 720 may obtain information upon which the determination is to be based. For example, the circuit/module for determining 720 may obtain information (e.g., from the memory device 708, or some other component of the apparatus 700) regarding mappings between various indications and certain types of information (e.g., at least one configuration of system information, at least one PLMN, or some other information). The circuit/module for determining 720 may then make the determination based on the obtained information. For example, the circuit/module for determining 720 may identify one or more of the indications that is mapped to at least one configuration of system information (e.g., associated with a particular cell ID) and/or at least one PLMN (e.g., associated with a particular cell ID) as discussed herein (e.g., in conjunction with FIGS. 2-6). The circuit/module for determining 720 may then output a result of the determination (e.g., an indication or indications) to the circuit/module for broadcasting 724, the circuit/module for sending 728, the memory device 708, or some other component.

The circuit/module for generating 722 may include circuitry and/or programming (e.g., code for generating 742 stored on the storage medium 704) adapted to perform several functions relating to, for example, generating an indication. In some aspects, the circuit/module for generating 722 (e.g., a means for generating) may correspond to, for example, a processing circuit.

Initially, the circuit/module for generating 722 may obtain information upon which the generation is to be based. For example, the circuit/module for generating 722 may obtain information (e.g., from the memory device 708, or some other component of the apparatus 700) that specifies how an indication is to be generated (e.g., as a random number or as a function of a list). The circuit/module for generating 722 may then generate the indication(s) based on the obtained information. For example, the circuit/module for generating 722 may generate at least one indication as a random number, generate at least one indication as a function of a list of configurations of system information, or generate at least one indication as a function of a list of PLMN identifiers as discussed herein (e.g., in conjunction with FIGS. 2-6). The circuit/module for generating 722 may then output the indication(s) to the circuit/module for broadcasting 724, the circuit/module for sending 728, the memory device 708, or some other component.

The circuit/module for broadcasting 724 may include circuitry and/or programming (e.g., code for broadcasting 744 stored on the storage medium 704) adapted to perform several functions relating to, for example, broadcasting (e.g., transmitting via broadcast signaling or multicast signaling) information. In some implementations, the circuit/module for broadcasting 724 may obtain information (e.g., from the circuit/module for determining 720, the memory device 708, or some other component of the apparatus 700), process the information (e.g., encode the information for broadcast), and send the information to another component (e.g., the transmitter 714, the communication interface 702, or some other component) that will broadcast the information to another device. In some scenarios (e.g., if the circuit/module for broadcasting 724 includes a transmitter), the circuit/module for broadcasting 724 broadcasts the information directly to another device (e.g., the ultimate destinations) via radio frequency signaling or some other type of signaling suitable for the applicable communication medium.

The circuit/module for broadcasting 724 (e.g., a means for broadcasting) may take various forms. In some aspects, the circuit/module for broadcasting 724 may correspond to, for example, an interface (e.g., a bus interface, a send/receive interface, or some other type of signal interface), a communication device, a transceiver, a transmitter, or some other similar component as discussed herein. In some implementations, the communication interface 702 includes the circuit/module for broadcasting 724 and/or the code for broadcasting 744. In some implementations, the circuit/module for broadcasting 724 and/or the code for broadcasting 744 is configured to control the communication interface 702 (e.g., a transceiver or a transmitter) to broadcast information.

The circuit/module for establishing 726 may include circuitry and/or programming (e.g., code for establishing 746 stored on the storage medium 704) adapted to perform several functions relating to, for example, establishing a form of communication. In some aspects, the circuit/module for establishing 726 (e.g., a means for establishing) may correspond to, for example, a processing circuit.

In some implementations, the communication is established as a result of (e.g., after) the broadcasting of at least one indication. Thus, in some implementations, the circuit/module for establishing 726 receives an indication that the indication has been broadcast. The circuit/module for establishing 726 then takes the appropriate action (e.g., via the communication interface 702) to establish the desired communication (e.g., with a UE). For example, the circuit/module for establishing 726 may establish a RACH procedure with a UE or establish a connection with a UE as discussed herein (e.g., in conjunction with FIGS. 2-6).

The circuit/module for sending 728 may include circuitry and/or programming (e.g., code for sending 748 stored on the storage medium 704) adapted to perform several functions relating to, for example, sending (e.g., transmitting) information. In some implementations, the circuit/module for sending 728 may obtain information (e.g., from the circuit/module for determining 720, the memory device 708, or some other component of the apparatus 700), process the information (e.g., encode the information for transmission), and send the information to another component (e.g., the transmitter 714, the communication interface 702, or some other component) that will transmit the information to another device. In some scenarios (e.g., if the circuit/module for sending 728 includes a transmitter), the circuit/module for sending 728 transmits the information directly to another device (e.g., the ultimate destination) via radio frequency signaling or some other type of signaling suitable for the applicable communication medium.

The circuit/module for sending 728 (e.g., a means for sending) may take various forms. In some aspects, the circuit/module for sending 728 may correspond to, for example, an interface (e.g., a bus interface, a send/receive interface, or some other type of signal interface), a communication device, a transceiver, a transmitter, or some other similar component as discussed herein. In some implementations, the communication interface 702 includes the circuit/module for sending 728 and/or the code for sending 748. In some implementations, the circuit/module for sending 728 and/or the code for sending 748 is configured to control the communication interface 702 (e.g., a transceiver or a transmitter) to send information.

The circuit/module for maintaining 730 may include circuitry and/or programming (e.g., code for maintaining 750 stored on the storage medium 704) adapted to perform several functions relating to, for example, maintaining information. In some aspects, the circuit/module for maintaining 730 (e.g., a means for maintaining) may correspond to, for example, a processing circuit.

Initially, the circuit/module for maintaining 730 may obtain information that is to be maintained. For example, the circuit/module for maintaining 730 may obtain a set of system information (e.g., from the memory device 708, the circuit/module for receiving 722, or some other component of the apparatus 700) that include two or more system information subsets. The circuit/module for maintaining 730 may then store the obtained information. In addition, the circuit/module for maintaining 730 may output the information (e.g., in response to a request) to the circuit/module for determining 720, the memory device 708, or some other component of the apparatus 700.

First Example Process

Figure 8:
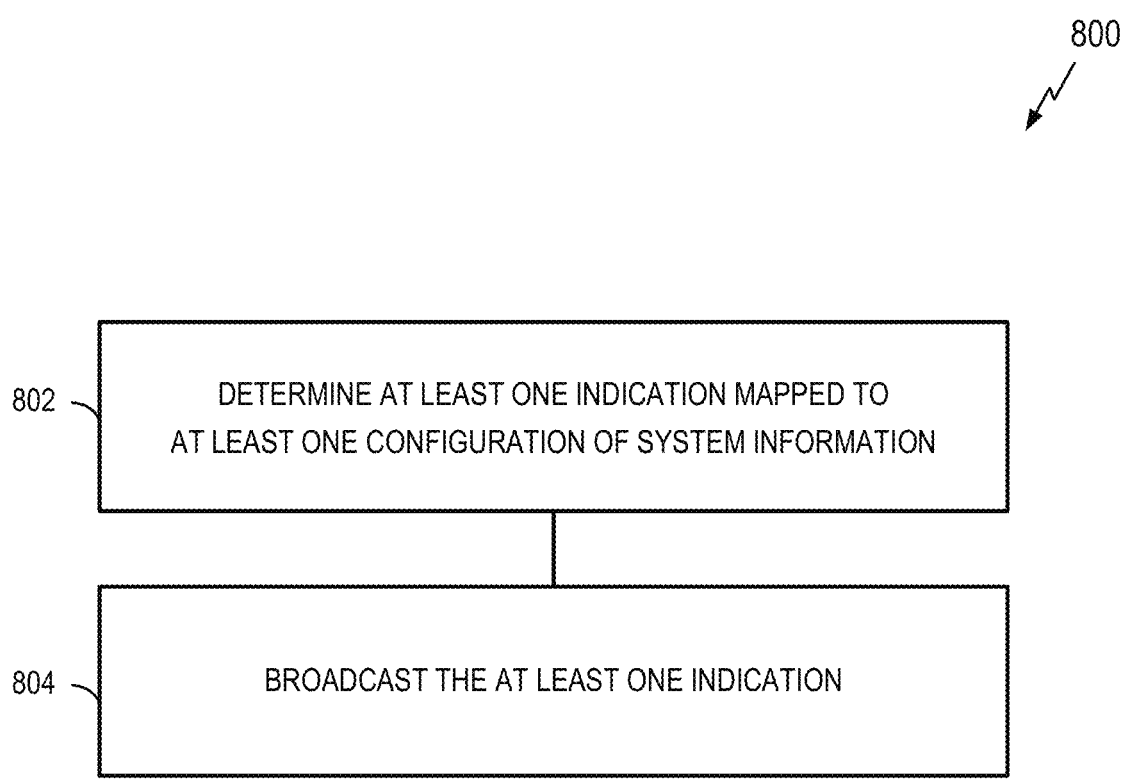
FIG. 8 is a flowchart illustrating an example of a process for broadcasting an indication related to system information in accordance with some aspects of the disclosure.

FIG. 8 illustrates a process 800 for communication in accordance with some aspects of the disclosure. The process 800 may take place within a processing circuit (e.g., the processing circuit 710 of FIG. 7), which may be located in a gNB, a TRP, a BS, an eNB, a UE, a CPE, or some other suitable apparatus. Of course, in various aspects within the scope of the disclosure, the process 800 may be implemented by any suitable apparatus capable of supporting communication-related operations.

At block 802, an apparatus (e.g., a gNB) determines at least one indication mapped to at least one configuration of system information. In some aspects, the at least one indication may indicate whether the at least one configuration of system information is valid.

The determination may take different forms in different implementations. In some aspects, the determination of the at least one indication may include generating the at least one indication as a random number. In some aspects, the determination of the at least one indication may include generating the at least one indication as a function of a list of configurations of system information. In some aspects, the determination of the at least one indication may include: identifying a plurality of configurations of system information; and identifying, for each of the plurality of configurations, a corresponding indication for that particular configuration.

The system information may take different forms in different implementations. In some aspects, the system information may include: access class barring information, a cell identifier, a cell selection parameter, a cell reselection parameter, a physical layer configuration for random access, physical layer configuration information for paging, a tracking area, or any combination thereof. In some aspects, the system information may include: at least one non-cell-related parameter, at least one PLMN identifier, physical configuration information, or any combination thereof.

In some implementations, the circuit/module for determining 720 of FIG. 7 performs the operations of block 802. In some implementations, the code for determining 740 of FIG. 7 is executed to perform the operations of block 802.

At block 804, the apparatus broadcasts the at least one indication. In some aspects, the at least one indication may be broadcast via a physical broadcast channel.

In some implementations, the circuit/module for broadcasting 724 of FIG. 7 performs the operations of block 804. In some implementations, the code for broadcasting 744 of FIG. 7 is executed to perform the operations of block 804.

In some aspects, the process 800 may further include sending to a user equipment an indication of the mapping of the at least one indication to the at least one configuration of system information.

In some aspects, the process 800 may include any combination of the above operations.

Second Example Process

Figure 9:
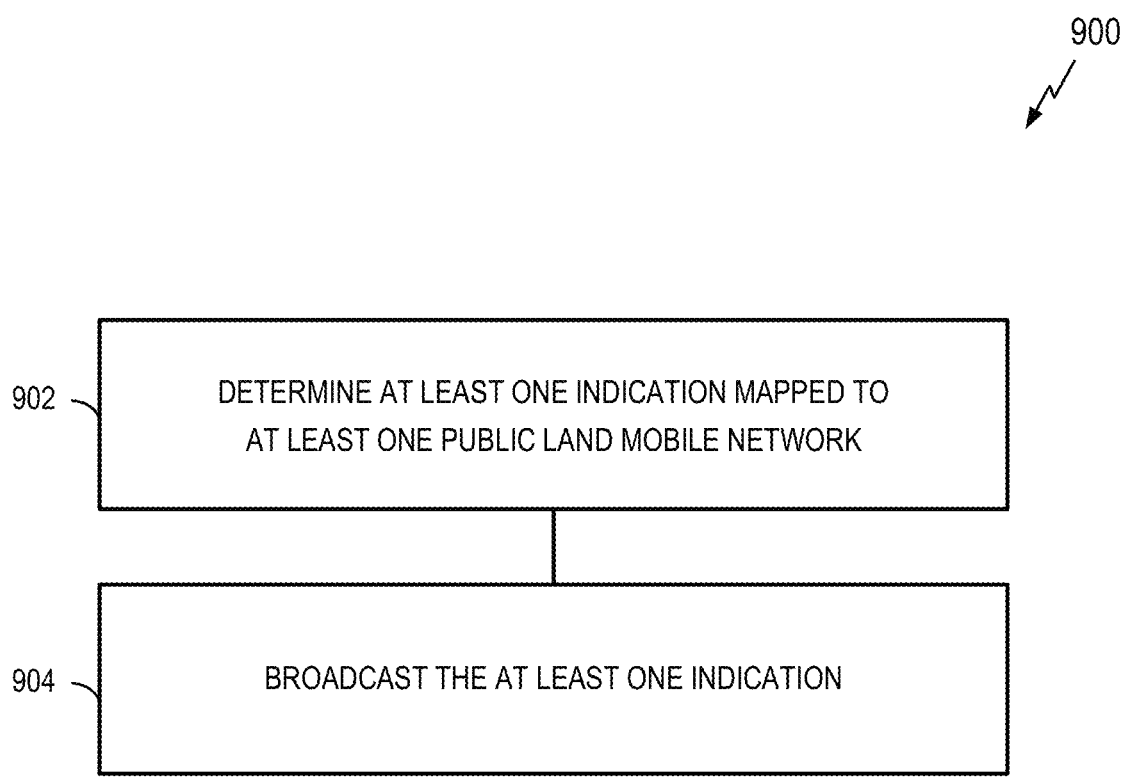
FIG. 9 is a flowchart illustrating an example of a process for broadcasting an indication related to at least one PLMN in accordance with some aspects of the disclosure.

FIG. 9 illustrates a process 900 for communication in accordance with some aspects of the disclosure. One or more aspects of the process 900 may be used in conjunction with (e.g., in addition to or as part of) the process 800 of FIG. 8. The process 900 may take place within a processing circuit (e.g., the processing circuit 710 of FIG. 7), which may be located in a gNB, a TRP, a BS, an eNB, a UE, a CPE, or some other suitable apparatus. Of course, in various aspects within the scope of the disclosure, the process 900 may be implemented by any suitable apparatus capable of supporting communication-related operations.

At block 902, an apparatus (e.g., a gNB) determines at least one indication mapped to at least one public land mobile network (PLMN). In some aspects, the at least one indication may be further mapped to at least one physical configuration parameter.

The determination may take different forms in different implementations. In some aspects, the determination of the at least one indication may include generating the at least one indication as a random number. In some aspects, the determination of the at least one indication may include generating the at least one indication as a function of a list of PLMN identifiers. In some aspects, the determination of the at least one indication may include: identifying a plurality of PLMNs; and identifying, for each of the plurality of PLMNs, a corresponding indication for that particular PLMN. In some aspects, the identifying of the plurality of PLMNs may include identifying a plurality of PLMNs associated with a carrier frequency.

In some implementations, the circuit/module for determining 720 of FIG. 7 performs the operations of block 902. In some implementations, the code for determining 740 of FIG. 7 is executed to perform the operations of block 902.

At block 904, the apparatus broadcasts the at least one indication. In some aspects, the at least one indication may be broadcast via a physical broadcast channel.

In some implementations, the circuit/module for broadcasting 724 of FIG. 7 performs the operations of block 904. In some implementations, the code for broadcasting 744 of FIG. 7 is executed to perform the operations of block 904.

In some aspects, the process 900 may further include, after broadcasting the at least one indication, establishing a connection with a user equipment (UE) and sending system information to the UE via unicast signaling over the connection. Here, the system information may include: access class barring information, a cell identifier, a cell selection parameter, a cell reselection parameter, a physical layer configuration for random access, physical layer configuration information for paging, a tracking area, or any combination thereof.

In some aspects, the process 900 may further include sending to a user equipment an indication of the mapping of the at least one indication to the at least one PLMN.

In some aspects, the process 900 may include any combination of the above operations.

Third Example Process

Figure 10:
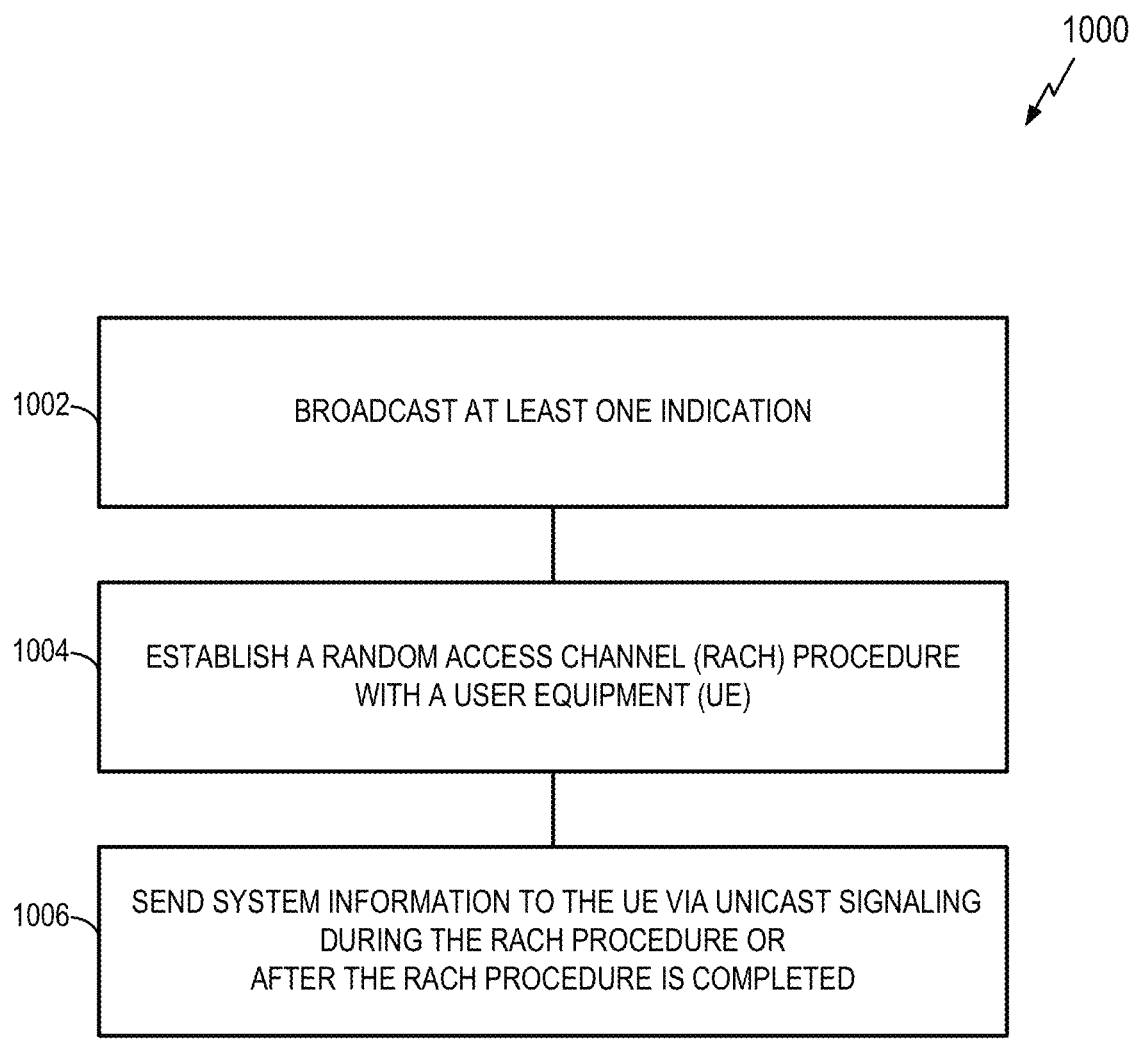
FIG. 10 is a flowchart illustrating an example of a process for sending system information in conjunction with a RACH procedure in accordance with some aspects of the disclosure.

FIG. 10 illustrates a process 1000 for communication in accordance with some aspects of the disclosure. One or more aspects of the process 1000 may be used in conjunction with (e.g., in addition to or as part of) the process 800 of FIG. 8, the process 900 of FIG. 9, or the process 1300 of FIG. 13. The process 1000 may take place within a processing circuit (e.g., the processing circuit 710 of FIG. 7), which may be located in a gNB, a TRP, a BS, an eNB, a UE, a CPE, or some other suitable apparatus. Of course, in various aspects within the scope of the disclosure, the process 1000 may be implemented by any suitable apparatus capable of supporting communication-related operations.

At block 1002, an apparatus (e.g., a gNB) broadcasts at least one indication. For example, the operations of block 1002 may correspond to the operations of block 804 of FIG. 8, block 904 of FIG. 9, or block 1306 of FIG. 13.

In some implementations, the circuit/module for broadcasting 724 of FIG. 7 performs the operations of block 1002. In some implementations, the code for broadcasting 744 of FIG. 7 is executed to perform the operations of block 1002.

At block 1004, the apparatus establishes a random access channel (RACH) procedure with a user equipment (UE).

In some implementations, the circuit/module for establishing 726 of FIG. 7 performs the operations of block 1004. In some implementations, the code for establishing 746 of FIG. 7 is executed to perform the operations of block 1004.

At block 1006, the apparatus sends system information to the UE via unicast signaling during the RACH procedure or after RACH procedure is completed. For example, the operations of block 1006 may correspond to the operations of block 1308 of FIG. 13. In some aspects, the system information may include: at least one non-cell-related parameter, at least one PLMN identifier, physical configuration information, or any combination thereof.

In some implementations, the circuit/module for sending 728 of FIG. 7 performs the operations of block 1006. In some implementations, the code for sending 748 of FIG. 7 is executed to perform the operations of block 1006.

In some aspects, the process 1000 may include any combination of the above operations.

Fourth Example Process

Figure 11:
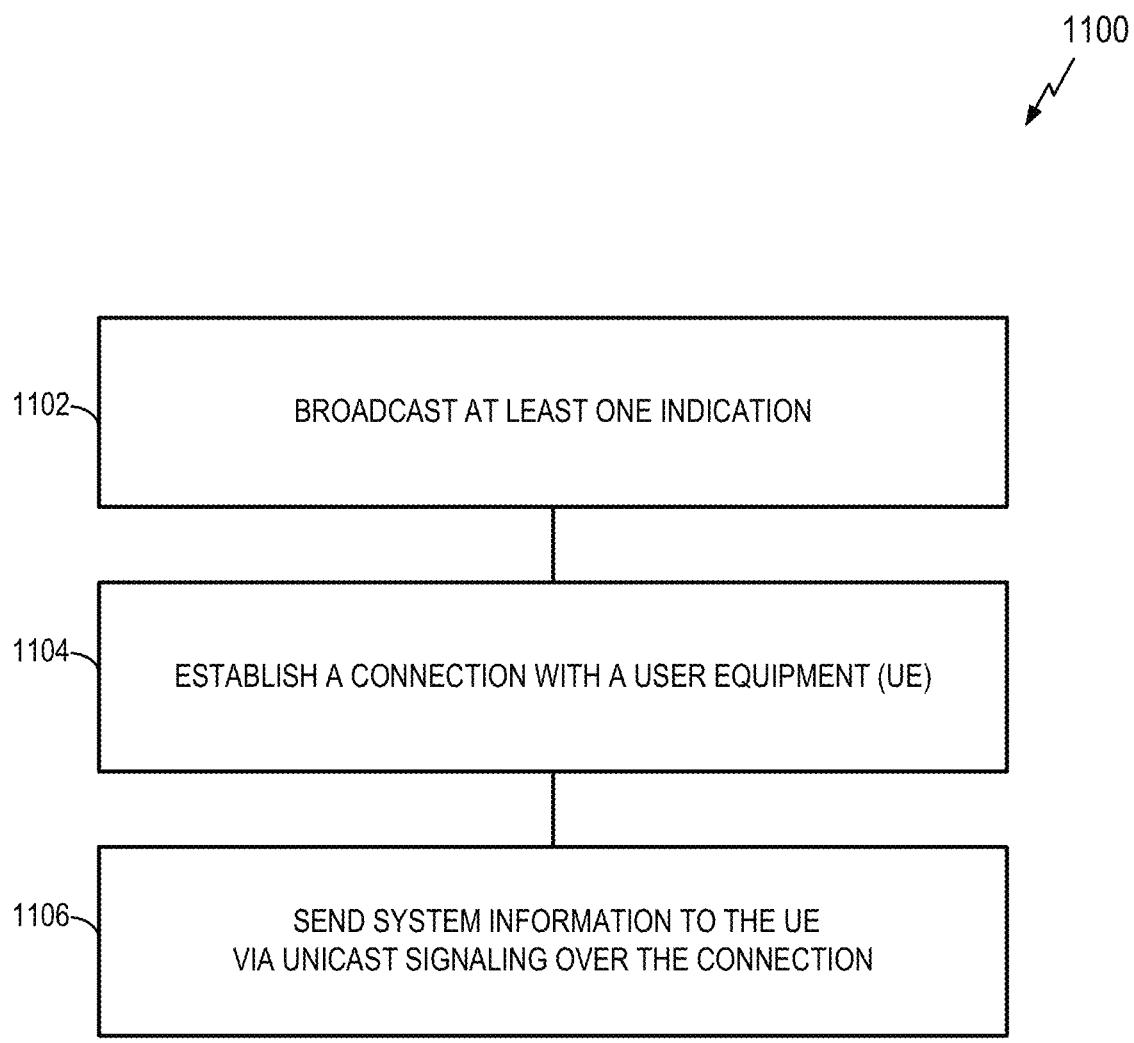
FIG. 11 is a flowchart illustrating an example of a process for sending system information via a connection with a UE in accordance with some aspects of the disclosure.

FIG. 11 illustrates a process 1100 for communication in accordance with some aspects of the disclosure. One or more aspects of the process 1100 may be used in conjunction with (e.g., in addition to or as part of) the process 800 of FIG. 8, the process 900 of FIG. 9, or the process 1300 of FIG. 13. The process 1100 may take place within a processing circuit (e.g., the processing circuit 710 of FIG. 7), which may be located in a gNB, a TRP, a BS, an eNB, a UE, a CPE, or some other suitable apparatus. Of course, in various aspects within the scope of the disclosure, the process 1100 may be implemented by any suitable apparatus capable of supporting communication-related operations.

At block 1102, an apparatus (e.g., a gNB) broadcasts at least one indication. For example, the operations of block 1102 may correspond to the operations of block 804 of FIG. 8, block 904 of FIG. 9, or block 1306 of FIG. 13.

In some implementations, the circuit/module for broadcasting 724 of FIG. 7 performs the operations of block 1102. In some implementations, the code for broadcasting 744 of FIG. 7 is executed to perform the operations of block 1102.

At block 1104, the apparatus establishes a connection with a user equipment (UE).

In some implementations, the circuit/module for establishing 726 of FIG. 7 performs the operations of block 1104. In some implementations, the code for establishing 746 of FIG. 7 is executed to perform the operations of block 1104.

At block 1106, the apparatus sends system information to the UE via unicast signaling over the connection. For example, the operations of block 1106 may correspond to the operations of block 1308 of FIG. 13. In some aspects, the system information may include: access class barring information, a cell identifier, a cell selection parameter, a cell reselection parameter, a physical layer configuration for random access, physical layer configuration information for paging, a tracking area, or any combination thereof.

In some aspects, the process 1100 may include any combination of the above operations.

Fifth Example Process

Figure 12:
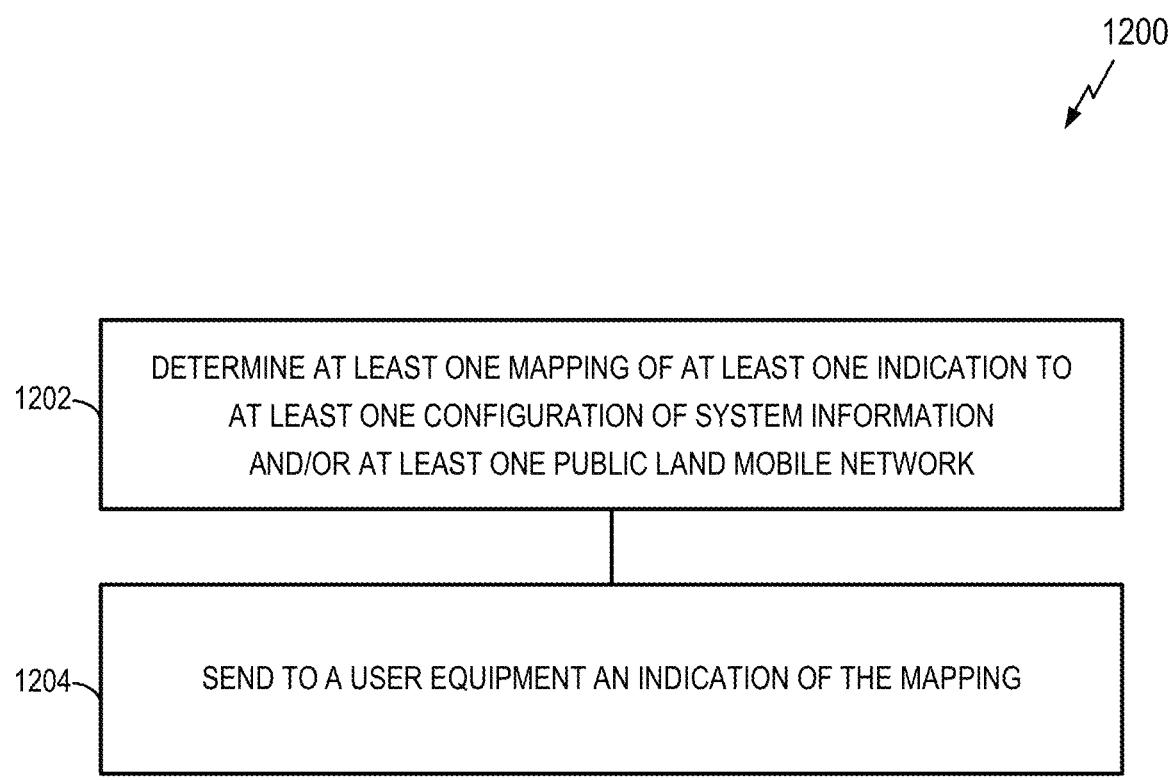
FIG. 12 is a flowchart illustrating an example of a process for sending an indication of a mapping to a UE in accordance with some aspects of the disclosure.

FIG. 12 illustrates a process 1200 for communication in accordance with some aspects of the disclosure. One or more aspects of the process 1200 may be used in conjunction with (e.g., in addition to or as part of) the process 800 of FIG. 8, the process 900 of FIG. 9, or the process 1300 of FIG. 13. The process 1200 may take place within a processing circuit (e.g., the processing circuit 710 of FIG. 7), which may be located in a gNB, a TRP, a BS, an eNB, a UE, a CPE, or some other suitable apparatus. Of course, in various aspects within the scope of the disclosure, the process 1200 may be implemented by any suitable apparatus capable of supporting communication-related operations.

At block 1202, an apparatus (e.g., a gNB) determines at least one mapping of at least one indication to at least one configuration of system information (e.g., as in the process 800 or the process 1300) and/or at least one PLMN (e.g., as in the process 900).

In some implementations, the circuit/module for determining 720 of FIG. 7 performs the operations of block 1202. In some implementations, the code for determining 740 of FIG. 7 is executed to perform the operations of block 1202.

At block 1204, the apparatus sends to a UE an indication of the mapping of block 1202.

In some implementations, the circuit/module for sending 728 of FIG. 7 performs the operations of block 1204. In some implementations, the code for sending 748 of FIG. 7 is executed to perform the operations of block 1204.

In some aspects, the process 1200 may include any combination of the above operations.

Sixth Example Process

Figure 13:
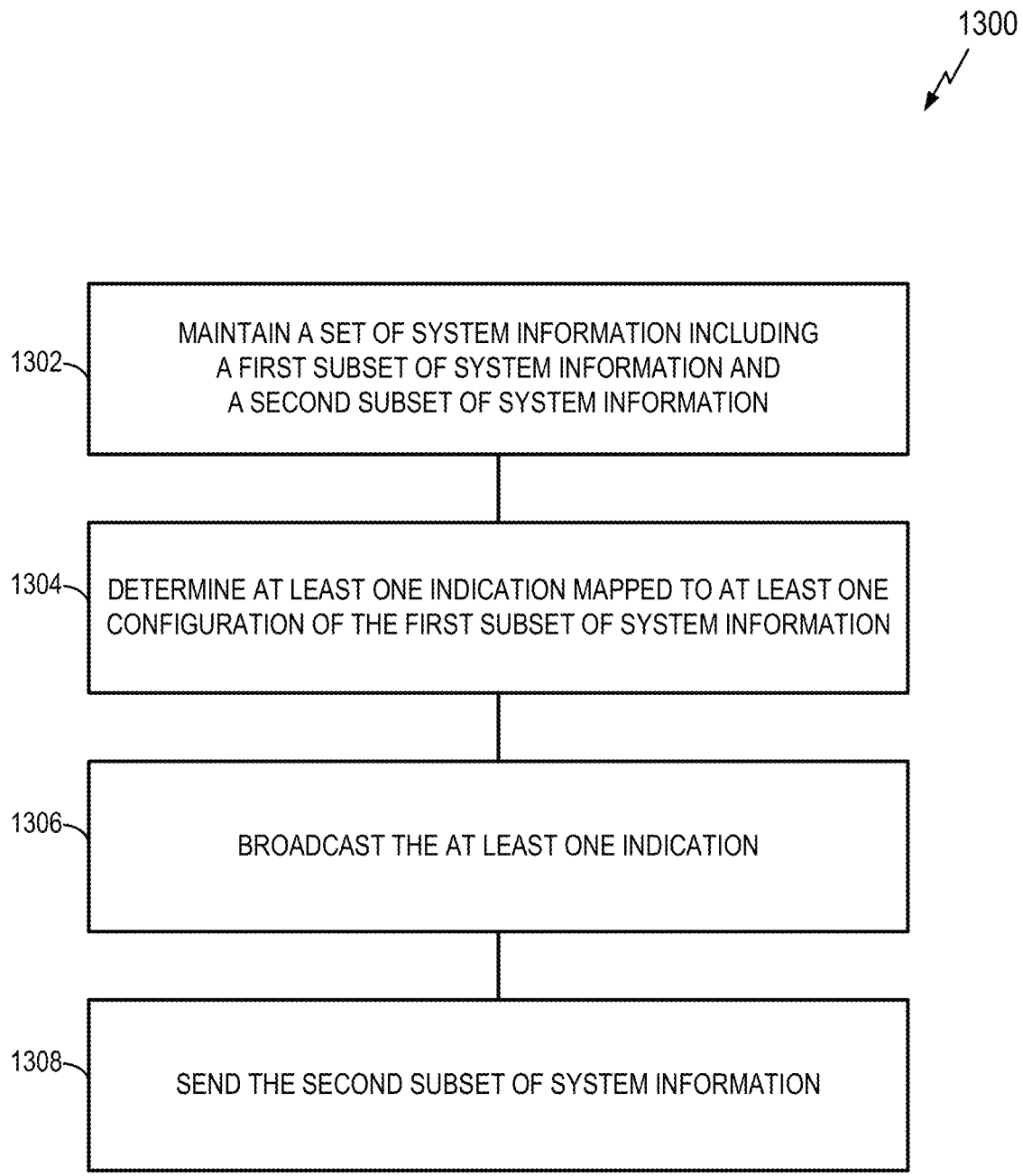
FIG. 13 is a flowchart illustrating an example of a process for sending different subsets of system information in accordance with some aspects of the disclosure.

FIG. 13 illustrates a process 1300 for communication in accordance with some aspects of the disclosure. The process 1300 may take place within a processing circuit (e.g., the processing circuit 710 of FIG. 7), which may be located in a gNB, a TRP, a BS, an eNB, a UE, a CPE, or some other suitable apparatus. Of course, in various aspects within the scope of the disclosure, the process 1300 may be implemented by any suitable apparatus capable of supporting communication-related operations.

At block 1302, an apparatus (e.g., a gNB) maintaining a set of system information comprising a first subset of system information and a second subset of system information. In some aspects, the first subset may include information to be sent in a compressed form (e.g., by broadcasting an indication) and the second subset may include information to be sent in an uncompressed form (e.g., sent via unicast signaling). In some aspects, the first subset of system information may include: at least one non-cell-related parameter, at least one PLMN identifier, physical configuration information, or any combination thereof. In some aspects, the second subset of system information may include: access class barring information, a cell identifier, a cell selection parameter, a cell reselection parameter, a physical layer configuration for random access, physical layer configuration information for paging, a tracking area, or any combination thereof.

In some implementations, the circuit/module for maintaining 730 of FIG. 7 performs the operations of block 1302. In some implementations, the code for maintaining 750 of FIG. 7 is executed to perform the operations of block 1302.

At block 1304, the apparatus determines at least one indication mapped to at least one configuration of the first subset of system information. In some aspects, the at least one indication may indicate whether the at least one configuration is valid. In some aspects, a decision of whether to broadcast the at least one indication (e.g., instead of broadcasting the first subset of system information) may be made based on a determination of whether a link budget for the apparatus is limited (e.g., the link budget is less than or equal to a threshold). As discussed herein, a link budget may be limited if beamforming is used to send system information. Thus, a decision of whether to broadcast the at least one indication may be based on whether beamforming is being used.

The determination may take different forms in different implementations. In some aspects, the determination of the at least one indication may include generating the at least one indication as a random number. In some aspects, the determination of the at least one indication may include generating the at least one indication as a function of a list of configurations of system information. In some aspects, the determination of the at least one indication may include: identifying a plurality of configurations of the first subset of system information; and identifying, for each of the plurality of configurations, a corresponding indication for that particular configuration.

In some implementations, the circuit/module for determining 720 of FIG. 7 performs the operations of block 1304. In some implementations, the code for determining 740 of FIG. 7 is executed to perform the operations of block 1304.

At block 1306, the apparatus broadcasts the at least one indication. In some aspects, the at least one indication may be broadcast via a physical broadcast channel.

In some implementations, the circuit/module for broadcasting 724 of FIG. 7 performs the operations of block 1306. In some implementations, the code for broadcasting 744 of FIG. 7 is executed to perform the operations of block 1306.

At block 1308, the apparatus sends the second subset of system information. In some aspects, the second subset of system information may be sent via unicast signaling. For example, the process 1300 may include, after broadcasting the at least one indication, establishing a random access channel (RACH) procedure with a user equipment (UE), wherein the second subset of system information is sent to the UE via unicast signaling during the RACH procedure or after the RACH procedure is completed. As another example, the process 1300 may include, after broadcasting the at least one indication, establishing a connection with a user equipment (UE), wherein the second subset of system information is sent to the UE via unicast signaling over the connection.

In some implementations, the circuit/module for sending 728 of FIG. 7 performs the operations of block 1308. In some implementations, the code for sending 748 of FIG. 7 is executed to perform the operations of block 1308.

In some aspects, the process 1300 may further include sending to a user equipment an indication of the mapping of the at least one indication to the at least one configuration of the first subset of system information. In some implementations, the circuit/module for sending 728 of FIG. 7 performs this operation. In some implementations, the code for sending 748 of FIG. 7 is executed to perform this operation.

In some aspects, the process 1300 may include any combination of the above operations.

Second Example Apparatus

Figure 14:
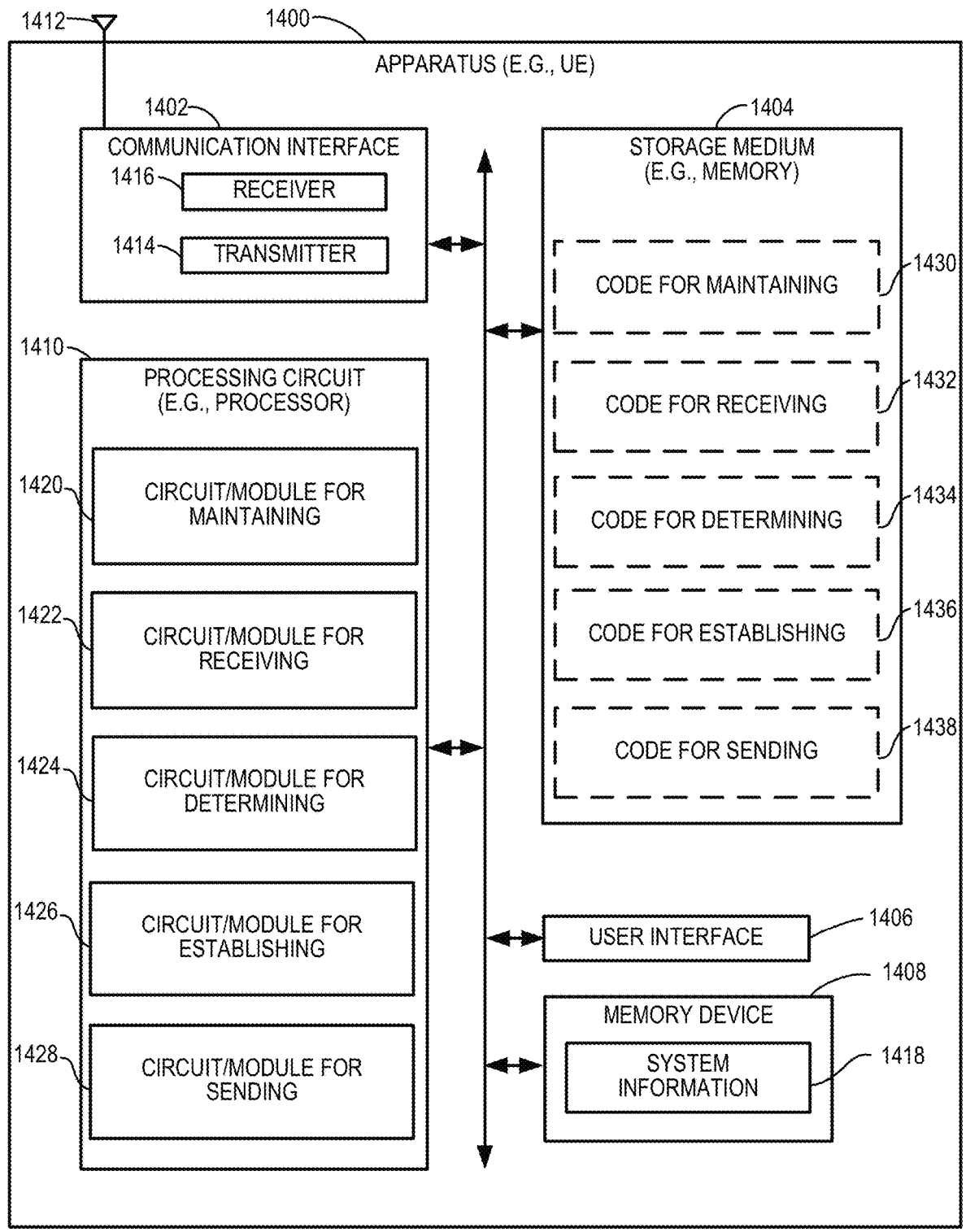
FIG. 14 is a block diagram illustrating an example hardware implementation for another apparatus (e.g., an electronic device) that can support communication in accordance with some aspects of the disclosure.

FIG. 14 illustrates a block diagram of an example hardware implementation of an apparatus 1400 configured to communicate according to one or more aspects of the disclosure. The apparatus 1400 could embody or be implemented within a UE, a CPE, a TRP, a base station (BS), an eNode B (eNB), a gNode B (gNB), or some other type of device that supports wireless communication. In various implementations, the apparatus 1400 could embody or be implemented within an access terminal, an access point, or some other type of device. In various implementations, the apparatus 1400 could embody or be implemented within a mobile phone, a smart phone, a tablet, a portable computer, a server, a personal computer, a sensor, an alarm, a vehicle, a machine, an entertainment device, a medical device, or any other electronic device having circuitry.

The apparatus 1400 includes a communication interface (e.g., at least one transceiver) 1402, a storage medium 1404, a user interface 1406, a memory device 1408 (e.g., storing system information 1418), and a processing circuit 1410 (e.g., at least one processor). In various implementations, the user interface 1406 may include one or more of: a keypad, a display, a speaker, a microphone, a touchscreen display, of some other circuitry for receiving an input from or sending an output to a user. The communication interface 1402 may be coupled to one or more antennas 1412, and may include a transmitter 1414 and a receiver 1416. In general, the components of FIG. 14 may be similar to corresponding components of the apparatus 700 of FIG. 7.

According to one or more aspects of the disclosure, the processing circuit 1410 may be adapted to perform any or all of the features, processes, functions, operations and/or routines for any or all of the apparatuses described herein. For example, the processing circuit 1410 may be configured to perform any of the steps, functions, and/or processes described with respect to FIGS. 1-6 and 15-21. As used herein, the term "adapted" in relation to the processing circuit 1410 may refer to the processing circuit 1410 being one or more of configured, employed, implemented, and/or programmed to perform a particular process, function, operation and/or routine according to various features described herein.

The processing circuit 1410 may be a specialized processor, such as an application-specific integrated circuit (ASIC) that serves as a means for (e.g., structure for) carrying out any one of the operations described in conjunction with FIGS. 1-6 and 15-21. The processing circuit 1410 serves as one example of a means for transmitting and/or a means for receiving. In various implementations, the processing circuit 1410 may provide and/or incorporate, at least in part, the functionality described above for the second apparatus 204 (e.g., the system information acquisition controller 212) of FIG. 2.

According to at least one example of the apparatus 1400, the processing circuit 1410 may include one or more of a circuit/module for maintaining 1420, a circuit/module for receiving 1422, a circuit/module for determining 1424, a circuit/module for establishing 1426, or a circuit/module for sending 1428. In some aspects, the circuit/module for maintaining 1420, the circuit/module for receiving 1422, the circuit/module for determining 1424, the circuit/module for establishing 1426, or the circuit/module for sending 1428 may provide and/or incorporate, at least in part, the functionality described above for the second apparatus 204 (e.g., the system information acquisition controller 212) of FIG. 2.

As mentioned above, programming stored by the storage medium 1404, when executed by the processing circuit 1410, causes the processing circuit 1410 to perform one or more of the various functions and/or process operations described herein. For example, the programming may cause the processing circuit 1410 to perform the various functions, steps, and/or processes described herein with respect to FIGS. 1-6 and 15-21 in various implementations. As shown in FIG. 14, the storage medium 1404 may include one or more of code for maintaining 1430, code for receiving 1432, code for determining 1434, code for establishing 1436, or code for sending 1438. In various implementations, the code for maintaining 1430, the code for receiving 1432, the code for determining 1434, the code for establishing 1436, or the code for sending 1438 may be executed or otherwise used to provide the functionality described herein for the circuit/module for maintaining 1420, the circuit/module for receiving 1422, the circuit/module for determining 1424, the circuit/module for establishing 1426, or the circuit/module for sending 1428.

The circuit/module for maintaining 1420 may include circuitry and/or programming (e.g., code for maintaining 1430 stored on the storage medium 1404) adapted to perform several functions relating to, for example, maintaining a mapping. In some aspects, the circuit/module for maintaining 1420 (e.g., a means for maintaining) may correspond to, for example, a processing circuit.

Initially, the circuit/module for maintaining 1420 may obtain information that is to be maintained. For example, the circuit/module for maintaining 1420 may obtain information (e.g., from the memory device 1408, the circuit/module for receiving 1422, or some other component of the apparatus 1400) regarding different mappings and corresponding information (e.g., configuration of system information and/or PLMNs). The circuit/module for maintaining 1420 may then store the obtained information. In addition, the circuit/module for maintaining 1420 may output an indication of the mapping (e.g., in response to a request) to the circuit/module for determining 1424, the memory device 1408, or some other component of the apparatus 1400.

The circuit/module for receiving 1422 may include circuitry and/or programming (e.g., code for receiving 1432 stored on the storage medium 1404) adapted to perform several functions relating to, for example, receiving information. In some scenarios, the circuit/module for receiving 1422 may obtain information (e.g., from the communication interface 1402, the memory device, or some other component of the apparatus 1400) and process (e.g., decode) the information. In some scenarios (e.g., if the circuit/module for receiving 1422 is or includes an RF receiver), the circuit/module for receiving 1422 may receive information directly from a device that transmitted the information. In either case, the circuit/module for receiving 1422 may output the obtained information to another component of the apparatus 1400 (e.g., the circuit/module for determining 1424, the memory device 1408, or some other component).

The circuit/module for receiving 1422 (e.g., a means for receiving) may take various forms. In some aspects, the circuit/module for receiving 1422 may correspond to, for example, an interface (e.g., a bus interface, a send/receive interface, or some other type of signal interface), a communication device, a transceiver, a receiver, or some other similar component as discussed herein. In some implementations, the communication interface 1402 includes the circuit/module for receiving 1422 and/or the code for receiving 1432. In some implementations, the circuit/module for receiving 1422 and/or the code for receiving 1432 is configured to control the communication interface 1402 (e.g., a transceiver or a receiver) to receive information.

The circuit/module for determining 1424 may include circuitry and/or programming (e.g., code for determining 1434 stored on the storage medium 1404) adapted to perform several functions relating to, for example, determining information (e.g., determining a valid configuration of system information, determining whether information has changed or expired, determining whether a configuration has changed or expired, or determining a PLMN). In some aspects, the circuit/module for determining 1424 (e.g., a means for determining) may correspond to, for example, a processing circuit.

Initially, the circuit/module for determining 1424 may obtain information upon which the determination is to be based. For example, the circuit/module for determining 1424 may obtain (e.g., from the memory device 1408, the circuit/module for receiving 1420, or some other component of the apparatus 1400) information regarding a mapping and at least one received indication, information regarding maintained system information, information regarding a physical layer configuration, or information regarding PLMNs. The circuit/module for determining 1424 may then make the determination based on the obtained information. For example, the circuit/module for determining 1424 may determine at least one valid configuration of system information (e.g., based on a mapping and at least one received indication) as discussed herein (e.g., in conjunction with FIGS. 2-6). As another example, the circuit/module for determining 1424 may determine that system information maintained at the apparatus 1400 has changed or has expired as discussed herein (e.g., in conjunction with FIGS. 2-6). As yet another example, the circuit/module for determining 1424 may determine that a physical layer configuration has changed or has expired as discussed herein (e.g., based on a mapping and at least one received indication) as discussed herein (e.g., in conjunction with FIGS. 2-6). As a further example, the circuit/module for determining 1424 may determine at least one PLMN with which communication can be established (e.g., based on a mapping and at least one received indication) as discussed herein (e.g., in conjunction with FIGS. 2-6). The circuit/module for determining 1424 may then output an indication of the determination (e.g., to the circuit/module for establishing 1426, the memory device 1408, or some other component).

The circuit/module for establishing 1426 may include circuitry and/or programming (e.g., code for establishing 1436 stored on the storage medium 1404) adapted to perform several functions relating to, for example, establishing a form of communication. In some aspects, the circuit/module for establishing 1426 (e.g., a means for establishing) may correspond to, for example, a processing circuit.

In some implementations, the communication is established based on at least one criterion. Thus, in some implementations, the circuit/module for establishing 1426 receives an indication of the at least one criterion. The circuit/module for establishing 1426 then takes the appropriate action (e.g., via the communication interface 1402) to establish the desired communication (e.g., with another apparatus). For example, the circuit/module for establishing 1426 may establish a RACH procedure with another apparatus according to at least one valid configuration of system information and/or establish communication with another apparatus according to at least one valid configuration of system information, as discussed herein (e.g., in conjunction with FIGS. 2-6). As another example, the circuit/module for establishing 1426 may establish a RACH procedure with another apparatus associated with a particular PLMN (or particular PLMNs) and/or establish communication with another apparatus associated with a particular PLMN (or particular PLMNs), as discussed herein (e.g., in conjunction with FIGS. 2-6).

The circuit/module for sending 1428 may include circuitry and/or programming (e.g., code for sending 1438 stored on the storage medium 1404) adapted to perform several functions relating to, for example, sending (e.g., transmitting) information. In some implementations, the circuit/module for sending 1428 may obtain information (e.g., from the circuit/module for determining 1420, the memory device 1408, or some other component of the apparatus 1400), process the information (e.g., encode the information for transmission), and send the information to another component (e.g., the transmitter 1414, the communication interface 1402, or some other component) that will transmit the information to another device. In some scenarios (e.g., if the circuit/module for sending 1428 includes a transmitter), the circuit/module for sending 1428 transmits the information directly to another device (e.g., the ultimate destination) via radio frequency signaling or some other type of signaling suitable for the applicable communication medium.

The circuit/module for sending 1428 (e.g., a means for sending) may take various forms. In some aspects, the circuit/module for sending 1428 may correspond to, for example, an interface (e.g., a bus interface, a send/receive interface, or some other type of signal interface), a communication device, a transceiver, a transmitter, or some other similar component as discussed herein. In some implementations, the communication interface 1402 includes the circuit/module for sending 1428 and/or the code for sending 1438. In some implementations, the circuit/module for sending 1428 and/or the code for sending 1438 is configured to control the communication interface 1402 (e.g., a transceiver or a transmitter) to send information.

Seventh Example Process

Figure 15:
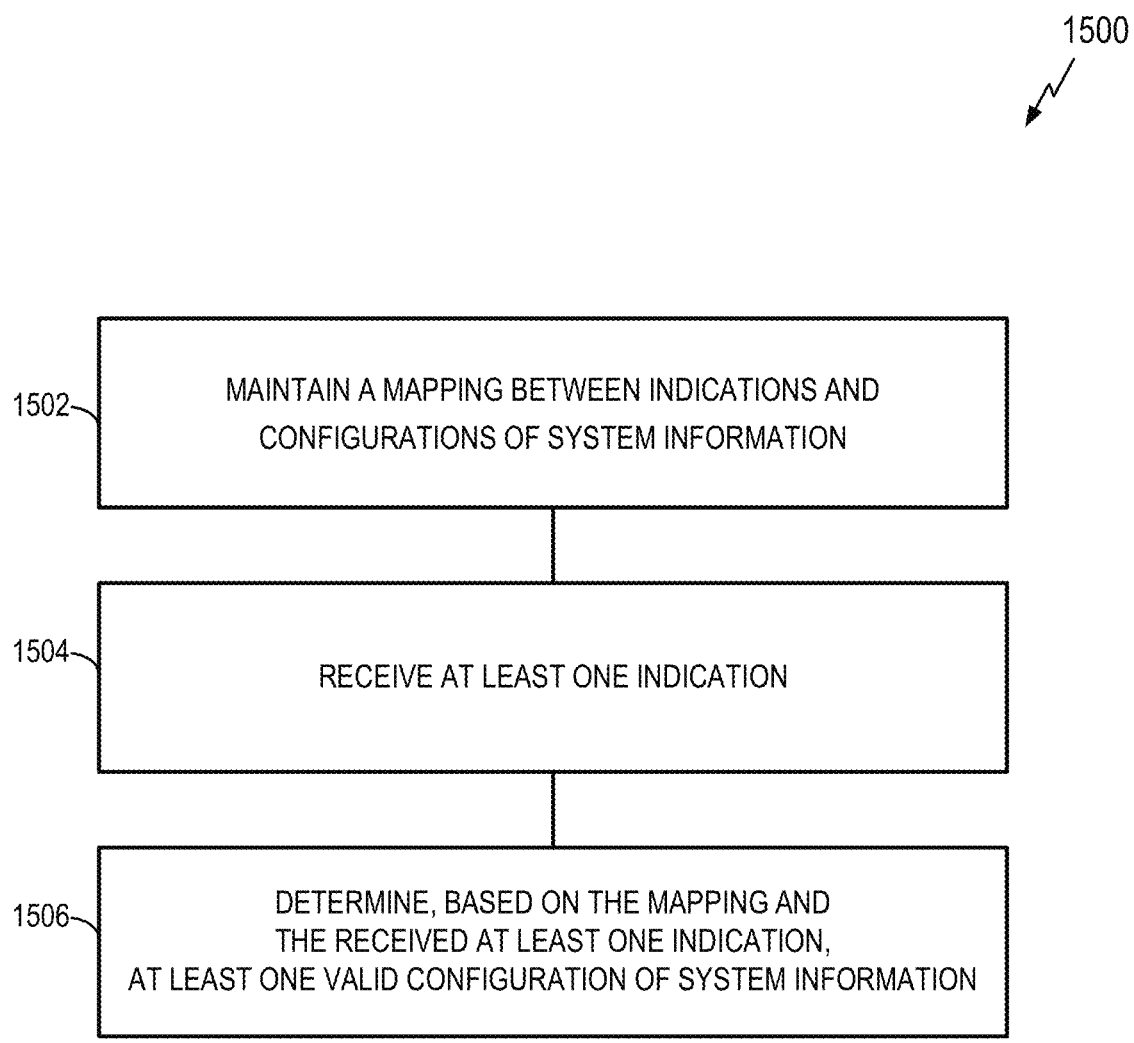
FIG. 15 is a flowchart illustrating an example of a process for determining a valid configuration of system information in accordance with some aspects of the disclosure.

FIG. 15 illustrates a process 1500 for communication in accordance with some aspects of the disclosure. The process 1500 may take place within a processing circuit (e.g., the processing circuit 1410 of FIG. 14), which may be located in a UE, a CPE, a TRP, a BS, an eNB, a gNB, or some other suitable apparatus. Of course, in various aspects within the scope of the disclosure, the process 1500 may be implemented by any suitable apparatus capable of supporting communication-related operations.

At block 1502, an apparatus (e.g., a UE) maintains a mapping between indications and configurations of system information. In some aspects, the process 1500 may further include receiving the mapping from a network entity. In some aspects, the mapping may be preconfigured in the apparatus (e.g., in a subscriber identity module).

The system information may take different forms in different implementations. In some aspects, the system information may include: access class barring information, a cell identifier, a cell selection parameter, a cell reselection parameter, a physical layer configuration for random access, physical layer configuration information for paging, a tracking area, or any combination thereof. In some aspects, the system information may include: at least one non-cell-related parameter, at least one PLMN identifier, physical configuration information, or any combination thereof.

In some implementations, the circuit/module for maintaining 1420 of FIG. 14 performs the operations of block 1502. In some implementations, the code for maintaining 1430 of FIG. 14 is executed to perform the operations of block 1502.

At block 1504, the apparatus receives at least one indication. In some aspects, the at least one indication may be received via a physical broadcast channel.

In some implementations, the circuit/module for receiving 1422 of FIG. 14 performs the operations of block 1504. In some implementations, the code for receiving 1432 of FIG. 14 is executed to perform the operations of block 1504.

At block 1506, the apparatus determines, based on the mapping and the received at least one indication, at least one valid configuration of system information.

In some implementations, the circuit/module for determining 1424 of FIG. 14 performs the operations of block 1506. In some implementations, the code for determining 1434 of FIG. 14 is executed to perform the operations of block 1506.

In some aspects, the process 1500 may include any combination of the above operations.

Eighth Example Process

Figure 16:
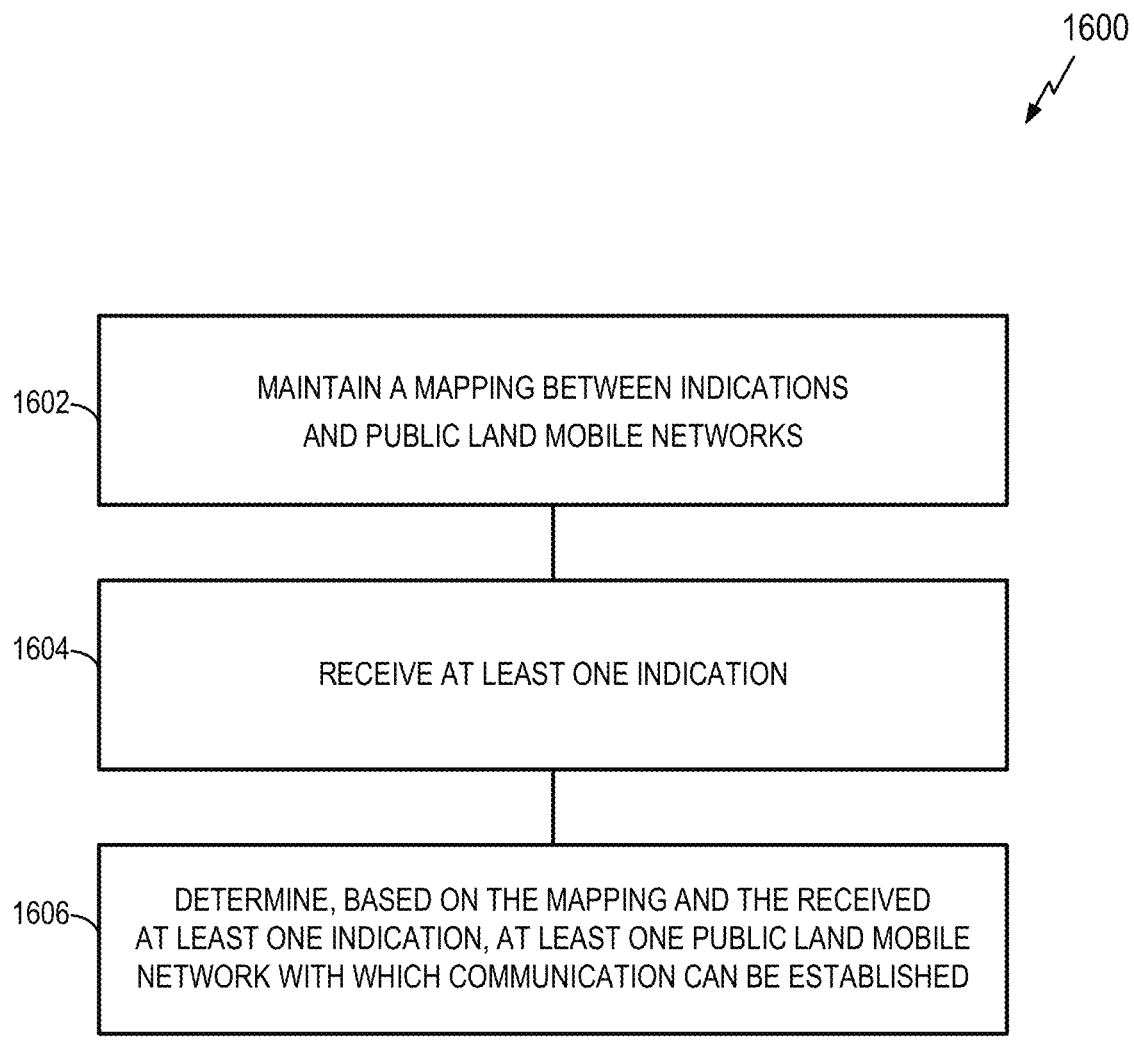
FIG. 16 is a flowchart illustrating an example of a process for determining a PLMN with which communication can be established in accordance with some aspects of the disclosure.

FIG. 16 illustrates a process 1600 for communication in accordance with some aspects of the disclosure. One or more aspects of the process 1600 may be used in conjunction with (e.g., in addition to or as part of) the process 1500 of FIG. 15. The process 1600 may take place within a processing circuit (e.g., the processing circuit 1410 of FIG. 14), which may be located in a UE, a CPE, a TRP, a BS, an eNB, a gNB, or some other suitable apparatus. Of course, in various aspects within the scope of the disclosure, the process 1600 may be implemented by any suitable apparatus capable of supporting communication-related operations.

At block 1602, an apparatus (e.g., a UE) maintains a mapping between indications and public land mobile networks (PLMNs). In some aspects, the process 1600 may further include receiving the mapping from a network entity. In some aspects, the mapping may be preconfigured in the apparatus (e.g., in a subscriber identity module).

In some implementations, the circuit/module for maintaining 1420 of FIG. 14 performs the operations of block 1602. In some implementations, the code for maintaining 1430 of FIG. 14 is executed to perform the operations of block 1602.

At block 1604, the apparatus receives at least one indication (e.g., receives at least one other indication). In some aspects, the at least one indication may be received via a physical broadcast channel. In some aspects, the at least one indication may be mapped to at least one physical configuration parameter.

In some implementations, the circuit/module for receiving 1422 of FIG. 14 performs the operations of block 1604. In some implementations, the code for receiving 1432 of FIG. 14 is executed to perform the operations of block 1604.

At block 1606, the apparatus determines, based on the mapping and the received at least one indication, at least one public land mobile network (PLMN) with which communication can be established.

In some implementations, the circuit/module for determining 1424 of FIG. 14 performs the operations of block 1606. In some implementations, the code for determining 1434 of FIG. 14 is executed to perform the operations of block 1606.

In some aspects, the process 1600 may further include establishing a random access channel (RACH) procedure with another apparatus associated with the determined at least one PLMN; and receiving system information via unicast signaling during the RACH procedure or after RACH procedure is completed. In some aspects, the system information may include: at least one non-cell-related parameter, at least one PLMN identifier, physical configuration information, or any combination thereof. In some aspects, the system information may include: access class barring information, a cell identifier, a cell selection parameter, a cell reselection parameter, a physical layer configuration for random access, physical layer configuration information for paging, a tracking area, or any combination thereof.

In some aspects, the process 1600 may include any combination of the above operations.

Ninth Example Process

Figure 17:
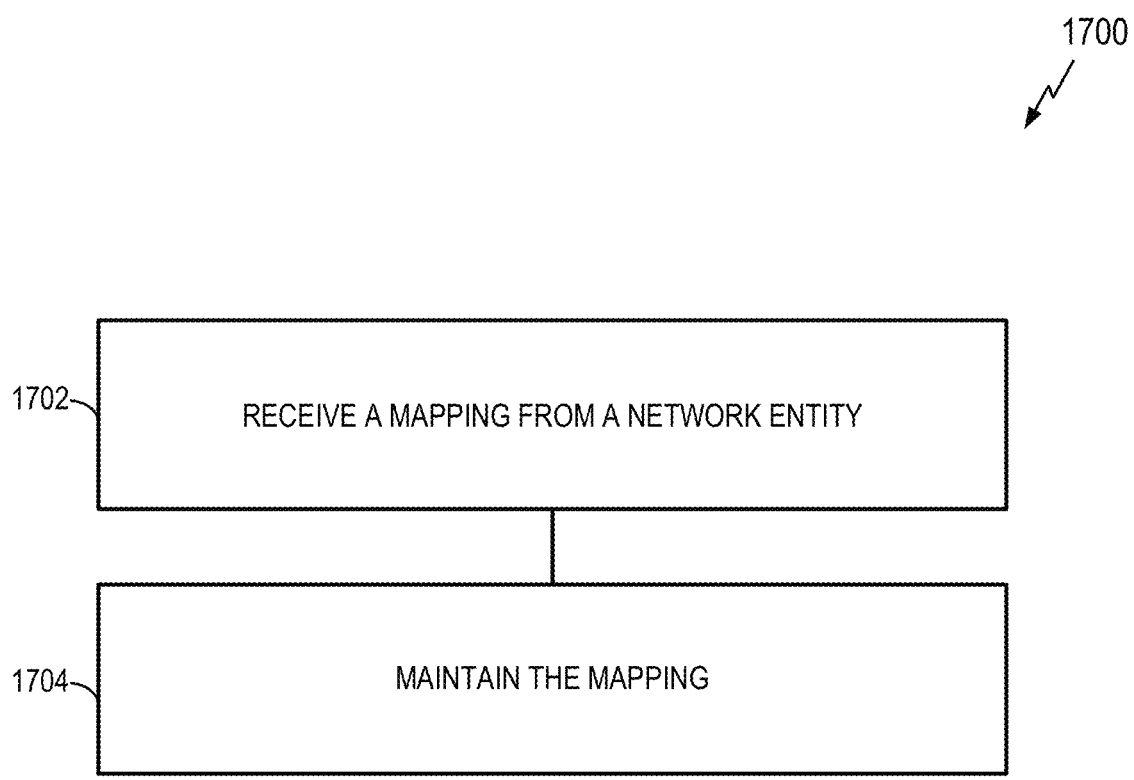
FIG. 17 is a flowchart illustrating an example of a process for receiving a mapping in accordance with some aspects of the disclosure.

FIG. 17 illustrates a process 1700 for communication in accordance with some aspects of the disclosure. One or more aspects of the process 1700 may be used in conjunction with (e.g., in addition to or as part of) the process 1500 of FIG. 15, the process 1600 of FIG. 16, or the process 2100 of FIG. 21. The process 1700 may take place within a processing circuit (e.g., the processing circuit 1410 of FIG. 14), which may be located in a UE, a CPE, a TRP, a BS, an eNB, a gNB, or some other suitable apparatus. Of course, in various aspects within the scope of the disclosure, the process 1700 may be implemented by any suitable apparatus capable of supporting communication-related operations.

At block 1702, an apparatus (e.g., a UE) receives a mapping (e.g., of the process 1500, the process 1600, or the process 2100) from a network entity (e.g., a gNB).

In some implementations, the circuit/module for receiving 1422 of FIG. 14 performs the operations of block 1702. In some implementations, the code for receiving 1432 of FIG. 14 is executed to perform the operations of block 1702.

At block 1704, the apparatus maintains the mapping. For example, the operations of block 1704 may correspond to the operations of block 1502 of FIG. 15, block 1602 of FIG. 16, or block 2102 of FIG. 21.

In some implementations, the circuit/module for maintaining 1420 of FIG. 14 performs the operations of block 1704. In some implementations, the code for maintaining 1430 of FIG. 14 is executed to perform the operations of block 1704.

In some aspects, the process 1700 may include any combination of the above operations.

Tenth Example Process

Figure 18:
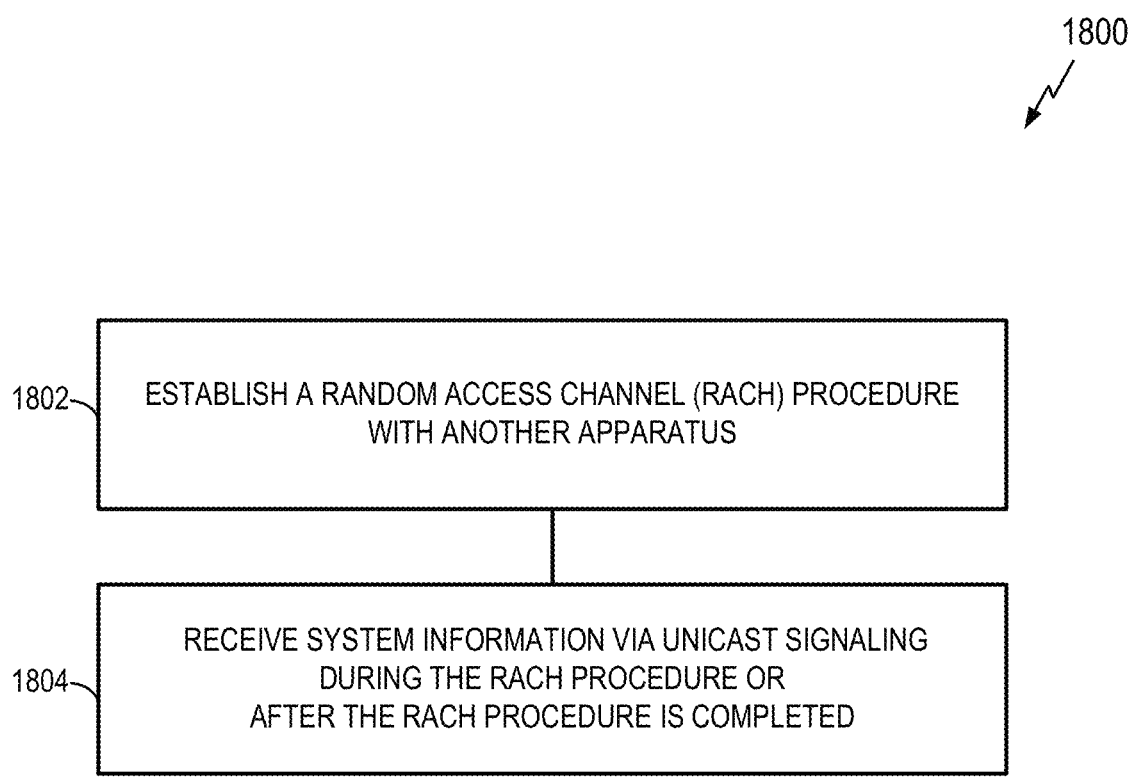
FIG. 18 is a flowchart illustrating an example of a process for receiving system information via unicast signaling in accordance with some aspects of the disclosure.

FIG. 18 illustrates a process 1800 for communication in accordance with some aspects of the disclosure. One or more aspects of the process 1800 may be used in conjunction with (e.g., in addition to or as part of) the process 1500 of FIG. 15, the process 1600 of FIG. 16, or the process 2100 of FIG. 21. The process 1800 may take place within a processing circuit (e.g., the processing circuit 1410 of FIG. 14), which may be located in a UE, a CPE, a TRP, a BS, an eNB, a gNB, or some other suitable apparatus. Of course, in various aspects within the scope of the disclosure, the process 1800 may be implemented by any suitable apparatus capable of supporting communication-related operations.

At block 1802, an apparatus (e.g., a UE) establishes a random access channel (RACH) procedure with another apparatus. In some aspects, the RACH procedure may be established according to the at least one valid configuration of system information of the process 1500 or the process 2100. In some aspects, the RACH procedure may be established with another apparatus that is associated with the at least one PLMN determined in the process 1600.

In some implementations, the circuit/module for establishing 1426 of FIG. 14 performs the operations of block 1802. In some implementations, the code for establishing 1436 of FIG. 14 is executed to perform the operations of block 1802.

At block 1804, the apparatus receives system information via unicast signaling during the RACH procedure or after the RACH procedure is completed. In some aspects, the system information may include: at least one non-cellrelated parameter, at least one PLMN identifier, physical configuration information, or any combination thereof.

In some implementations, the circuit/module for receiving 1422 of FIG. 14 performs the operations of block 1804. In some implementations, the code for receiving 1432 of FIG. 14 is executed to perform the operations of block 1804.

In some aspects, the process 1800 may include any combination of the above operations.

Eleventh Example Process

Figure 19:
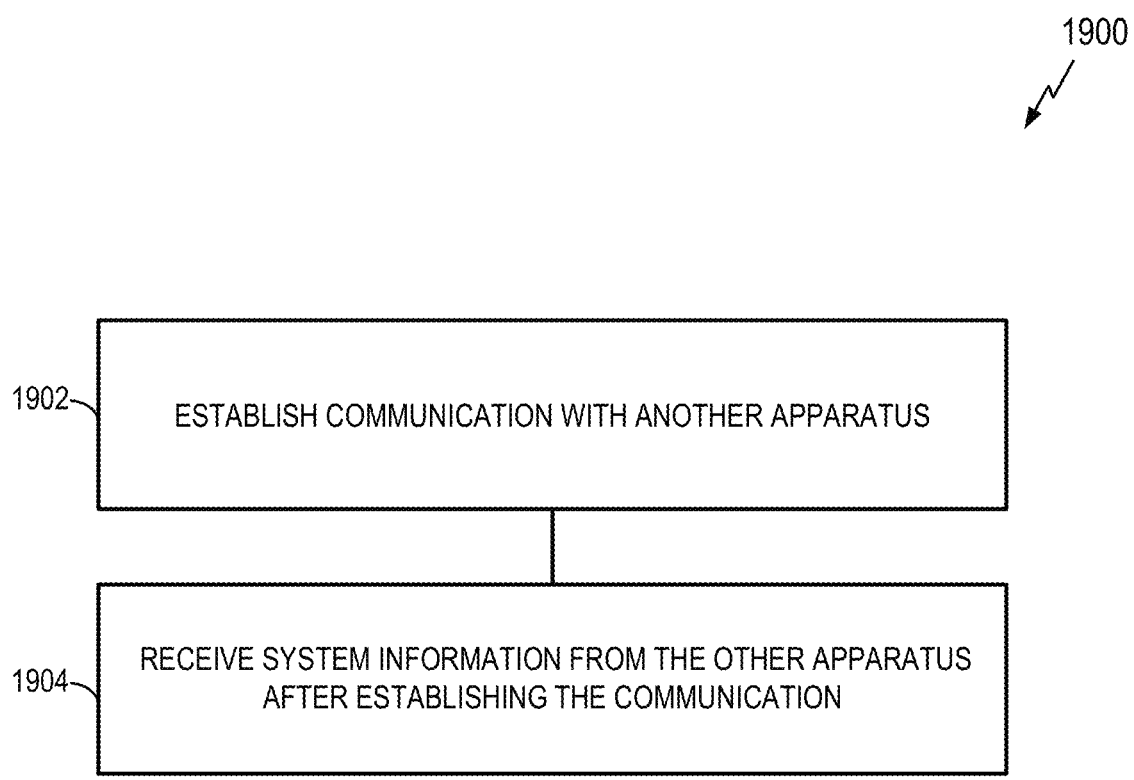
FIG. 19 is a flowchart illustrating an example of a process for receiving system information in accordance with some aspects of the disclosure.

FIG. 19 illustrates a process 1900 for communication in accordance with some aspects of the disclosure. One or more aspects of the process 1900 may be used in conjunction with (e.g., in addition to or as part of) the process 1500 of FIG. 15, the process 1600 of FIG. 16, or the process 2100 of FIG. 21. The process 1900 may take place within a processing circuit (e.g., the processing circuit 1410 of FIG. 14), which may be located in a UE, a CPE, a TRP, a BS, an eNB, a gNB, or some other suitable apparatus. Of course, in various aspects within the scope of the disclosure, the process 1900 may be implemented by any suitable apparatus capable of supporting communication-related operations.

At block 1902, an apparatus (e.g., a UE) establishes communication with another apparatus. In some aspects, the communication may be established according to the at least one valid configuration of system information of the process 1500 or the process 2100. In some aspects, the apparatus may be associated with the at least one PLMN determined in the process 1600.

In some implementations, the circuit/module for establishing 1426 of FIG. 14 performs the operations of block 1902. In some implementations, the code for establishing 1436 of FIG. 14 is executed to perform the operations of block 1902.

At block 1904, the apparatus receives system information from the other apparatus after establishing the communication of block 1902.

In some implementations, the circuit/module for receiving 1422 of FIG. 14 performs the operations of block 1904. In some implementations, the code for receiving 1432 of FIG. 14 is executed to perform the operations of block 1904.

In some aspects, the process 1900 may include any combination of the above operations.

Twelfth Example Process

Figure 20:
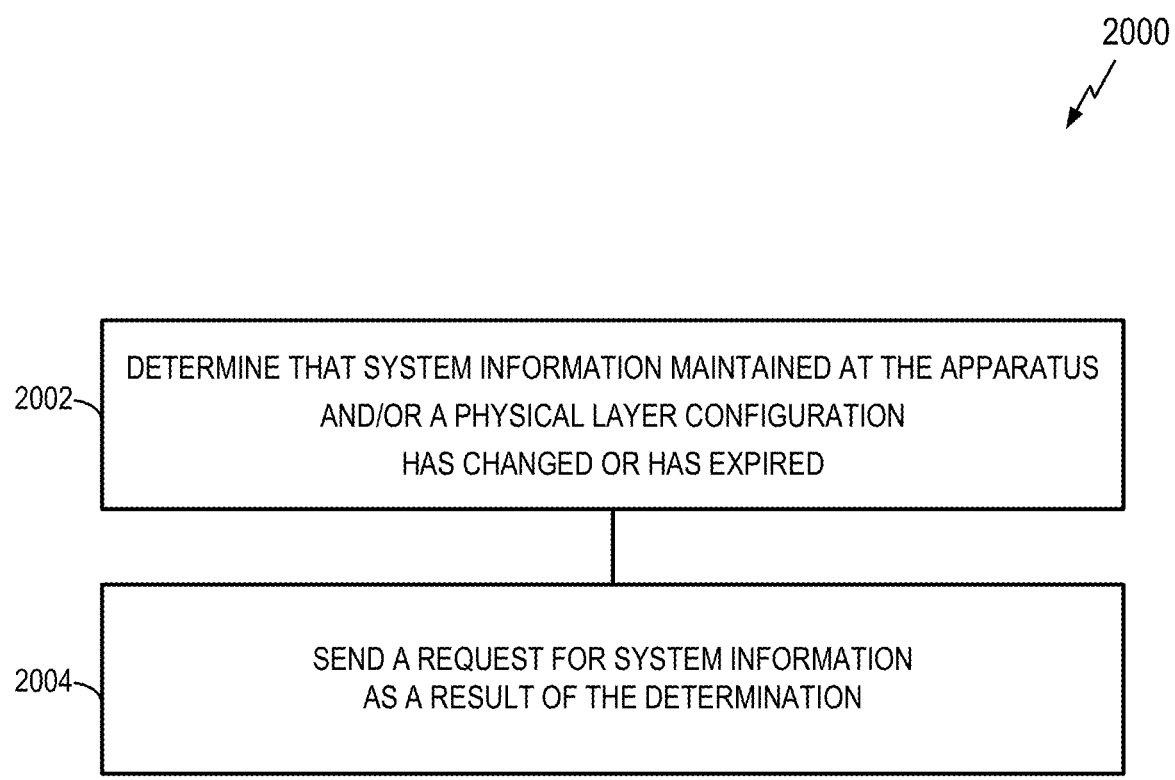
FIG. 20 is a flowchart illustrating an example of a process for requesting system information in accordance with some aspects of the disclosure.

FIG. 20 illustrates a process 2000 for communication in accordance with some aspects of the disclosure. One or more aspects of the process 2000 may be used in conjunction with (e.g., in addition to or as part of) the process 1500 of FIG. 15, the process 1600 of FIG. 16, or the process 2100 of FIG. 21. The process 2000 may take place within a processing circuit (e.g., the processing circuit 1410 of FIG. 14), which may be located in a UE, a CPE, a TRP, a BS, an eNB, a gNB, or some other suitable apparatus. Of course, in various aspects within the scope of the disclosure, the process 2000 may be implemented by any suitable apparatus capable of supporting communication-related operations.

At block 2002, an apparatus (e.g., a UE) determines that system information maintained at the apparatus has changed or has expired and/or that a physical layer configuration has changed or has expired.

In some implementations, the circuit/module for determining 1424 of FIG. 14 performs the operations of block 2002. In some implementations, the code for determining 1434 of FIG. 14 is executed to perform the operations of block 2002.

At block 2004, the apparatus sends a request for system information (e.g., a request for additional system information) as a result of the determination of block 2002.

In some implementations, the circuit/module for sending 1428 of FIG. 14 performs the operations of block 2004. In some implementations, the code for sending 1438 of FIG. 14 is executed to perform the operations of block 2004.

In some aspects, the process 2000 may include any combination of the above operations.

Thirteenth Example Process

Figure 21:
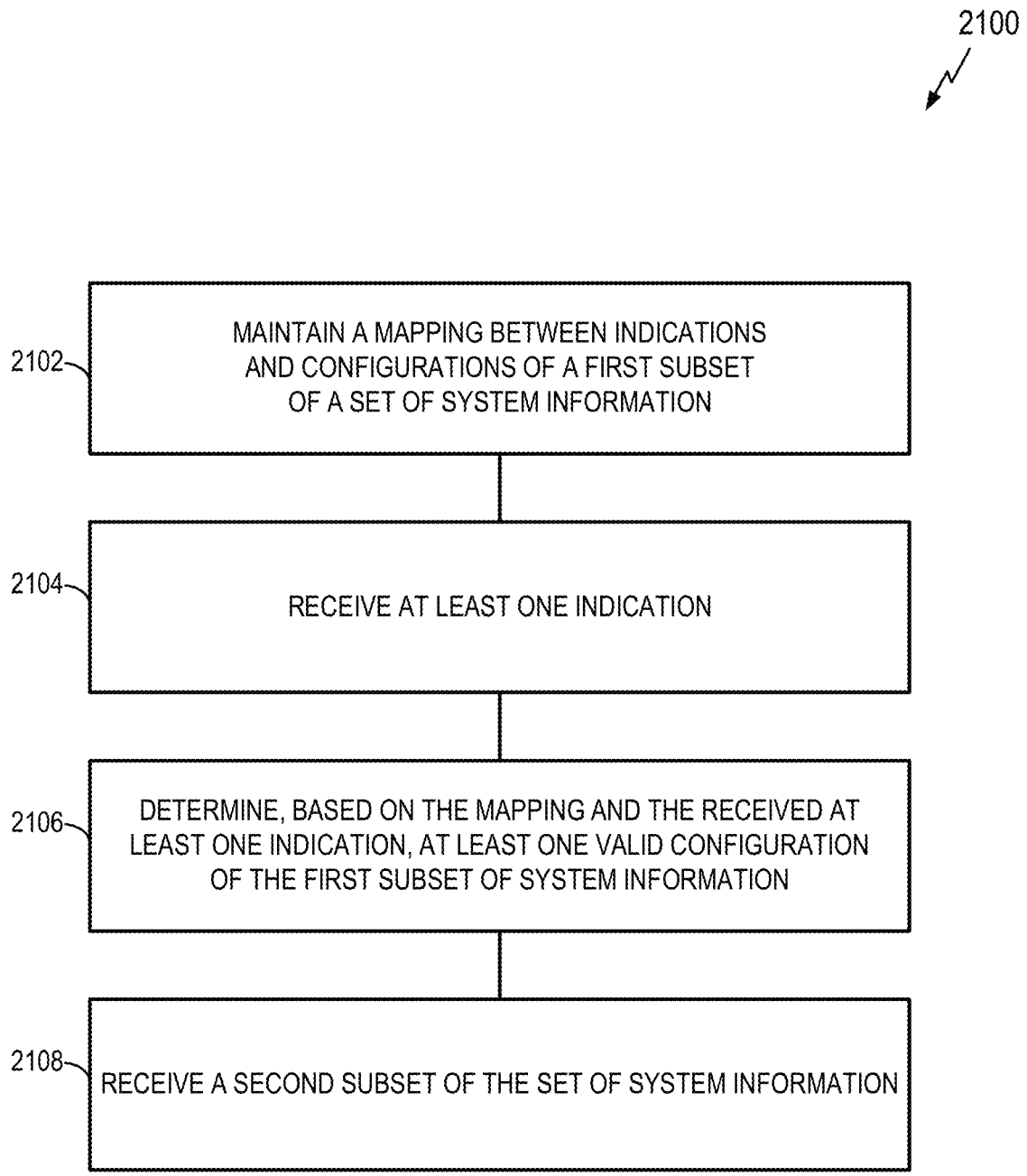
FIG. 21 is a flowchart illustrating an example of a process for receiving different subsets of system information in accordance with some aspects of the disclosure.

FIG. 21 illustrates a process 2100 for communication in accordance with some aspects of the disclosure. The process 2100 may take place within a processing circuit (e.g., the processing circuit 1410 of FIG. 14), which may be located in a UE, a CPE, a TRP, a BS, an eNB, a gNB, or some other suitable apparatus. Of course, in various aspects within the scope of the disclosure, the process 2100 may be implemented by any suitable apparatus capable of supporting communication-related operations.

At block 2102, an apparatus (e.g., a UE) maintains a mapping between indications and configurations of a first subset of a set of system information. In some aspects, the process 2100 may further include receiving the mapping from a network entity. In some aspects, the mapping may be preconfigured in the apparatus (e.g., in a subscriber identity module).

In some implementations, the circuit/module for maintaining 1420 of FIG. 14 performs the operations of block 2102. In some implementations, the code for maintaining 1430 of FIG. 14 is executed to perform the operations of block 2102.

At block 2104, the apparatus receives at least one indication. In some aspects, the at least one indication may be received via a physical broadcast channel.

In some implementations, the circuit/module for receiving 1422 of FIG. 14 performs the operations of block 2104. In some implementations, the code for receiving 1432 of FIG. 14 is executed to perform the operations of block 2104.

At block 2106, the apparatus determines, based on the mapping and the received at least one indication, at least one valid configuration of the first subset of system information. In some aspects, the first subset of system information may include: at least one non-cell-related parameter, at least one PLMN identifier, physical configuration information, or any combination thereof.

In some implementations, the circuit/module for determining 1424 of FIG. 14 performs the operations of block 2106. In some implementations, the code for determining 1434 of FIG. 14 is executed to perform the operations of block 2106.

At block 2108, the apparatus receives a second subset of the set of system information. In some aspects, the second subset of system information may include: access class barring information, a cell identifier, a cell selection parameter, a cell reselection parameter, a physical layer configuration for random access, physical layer configuration information for paging, a tracking area, or any combination thereof.

In some aspects, the at least one indication may be received via unicast signaling. For example, the process 2100 may include establishing a random access channel (RACH) procedure with another apparatus according to the at least one valid configuration of the first subset of system information, wherein the second subset of system information is received via unicast signaling during the RACH procedure or after the RACH procedure is completed. As another example, the process 2100 may include establishing communication with another apparatus according to the at least one valid configuration of the first subset of system information, wherein the second subset of system information is received from the other apparatus after establishing the communication.

In some implementations, the circuit/module for receiving 1422 of FIG. 14 performs the operations of block 2108. In some implementations, the code for receiving 1432 of FIG. 14 is executed to perform the operations of block 2108.

In some aspects, the process 2100 may include any combination of the above operations.

Additional Aspects

In one aspect, the disclosure provides an apparatus configured for communication that includes a memory device and a processing circuit coupled to the memory device. The processing circuit is configured to: determine at least one indication mapped to at least one configuration of system information; and broadcast the at least one indication.

Another aspect of the disclosure provides a method for communication including: determining at least one indication mapped to at least one configuration of system information; and broadcasting the at least one indication.

Another aspect of the disclosure provides an apparatus configured for communication. The apparatus including: means for determining at least one indication mapped to at least one configuration of system information; and means for broadcasting the at least one indication.

Another aspect of the disclosure provides a non-transitory computer-readable medium storing computer-executable code, including code to: determine at least one indication mapped to at least one configuration of system information; and broadcast the at least one indication.

In one aspect, the disclosure provides an apparatus configured for communication that includes a memory device and a processing circuit coupled to the memory device. The processing circuit is configured to: maintain a mapping between indications and configurations of system information; receive at least one indication; and determine, based on the mapping and the received at least one indication, at least one valid configuration of system information.

Another aspect of the disclosure provides a method for communication including: maintaining a mapping between indications and configurations of system information; receiving at least one indication; and determining, based on the mapping and the received at least one indication, at least one valid configuration of system information.

Another aspect of the disclosure provides an apparatus configured for communication. The apparatus including: means for maintaining a mapping between indications and configurations of system information; means for receiving at least one indication; and means for determining, based on the mapping and the received at least one indication, at least one valid configuration of system information.

Another aspect of the disclosure provides a non-transitory computer-readable medium storing computer-executable code, including code to: maintain a mapping between indications and configurations of system information; receive at least one indication; and determine, based on the mapping and the received at least one indication, at least one valid configuration of system information.

Another aspect of the disclosure provides an apparatus configured for communication that includes a memory device and a processing circuit coupled to the memory device. The processing circuit is configured to: determine at least one indication mapped to at least one public land mobile network (PLMN); and broadcast the at least one indication.

Another aspect of the disclosure provides a method for communication including: determining at least one indication mapped to at least one public land mobile network (PLMN); and broadcasting the at least one indication.

Another aspect of the disclosure provides an apparatus configured for communication. The apparatus including: means for determining at least one indication mapped to at least one public land mobile network (PLMN); and means for broadcasting the at least one indication.

Another aspect of the disclosure provides a non-transitory computer-readable medium storing computer-executable code, including code to: determine at least one indication mapped to at least one public land mobile network (PLMN); and broadcast the at least one indication.

Another aspect of the disclosure provides an apparatus configured for communication that includes a memory device and a processing circuit coupled to the memory device. The processing circuit is configured to: maintain a mapping between indications and public land mobile networks (PLMNs); receive at least one indication; and determine, based on the mapping and the received at least one indication, at least one public land mobile network (PLMN) with which communication can be established.

Another aspect of the disclosure provides a method for communication including: maintaining a mapping between indications and public land mobile networks (PLMNs); receiving at least one indication; and determining, based on the mapping and the received at least one indication, at least one public land mobile network (PLMN) with which communication can be established.

Another aspect of the disclosure provides an apparatus configured for communication. The apparatus including: means for maintaining a mapping between indications and public land mobile networks (PLMNs); means for receiving at least one indication; and means for determining, based on the mapping and the received at least one indication, at least one public land mobile network (PLMN) with which communication can be established.

Another aspect of the disclosure provides a non-transitory computer-readable medium storing computer-executable code, including code to: maintain a mapping between indications and public land mobile networks (PLMNs); receive at least one indication; and determine, based on the mapping and the received at least one indication, at least one public land mobile network (PLMN) with which communication can be established.

Other Aspects

The examples set forth herein are provided to illustrate certain concepts of the disclosure. Those of ordinary skill in the art will comprehend that these are merely illustrative in nature, and other examples may fall within the scope of the disclosure and the appended claims. Based on the teachings herein those skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein.

As those skilled in the art will readily appreciate, various aspects described throughout this disclosure may be extended to any suitable telecommunication system, network architecture, and communication standard. By way of example, various aspects may be applied to wide area networks, peer-to-peer network, local area network, other suitable systems, or any combination thereof, including those described by yet-to-be defined standards.

Many aspects are described in terms of sequences of actions to be performed by, for example, elements of a computing device. It will be recognized that various actions described herein can be performed by specific circuits, for example, central processing units (CPUs), graphic processing units (GPUs), digital signal processors (DSPs), application specific integrated circuits (ASICs), field programmable gate arrays (FPGAs), or various other types of general purpose or special purpose processors or circuits, by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

One or more of the components, steps, features and/or functions illustrated in above may be rearranged and/or combined into a single component, step, feature or function or embodied in several components, steps, or functions. Additional elements, components, steps, and/or functions may also be added without departing from novel features disclosed herein. The apparatus, devices, and/or components illustrated above may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of example processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The methods, sequences or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An example of a storage medium is coupled to the processor such that the processor can read information from, and write information to, the storage medium. In the alternative, the storage medium may be integral to the processor.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage or mode of operation.

The terminology used herein is for the purpose of describing particular aspects only and is not intended to be limiting of the aspects. As used herein, the singular forms "a," "an" and "the" are intended to include the plural forms as well, unless the context clearly indicates otherwise. It will be further understood that the terms "comprises," "comprising," "includes" or "including," when used herein, specify the presence of stated features, integers, steps, operations, elements, or components, but do not preclude the presence or addition of one or more other features, integers, steps, operations, elements, components, or groups thereof. Moreover, it is understood that the word "or" has the same meaning as the Boolean operator "OR," that is, it encompasses the possibilities of "either" and "both" and is not limited to "exclusive or" ("XOR"), unless expressly stated otherwise. It is also understood that the symbol "/" between two adjacent words has the same meaning as "or" unless expressly stated otherwise. Moreover, phrases such as "connected to," "coupled to" or "in communication with" are not limited to direct connections unless expressly stated otherwise.

Any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be used there or that the first element must precede the second element in some manner. Also, unless stated otherwise a set of elements may include one or more elements. In addition, terminology of the form "at least one of a, b, or c" or "a, b, c, or any combination thereof" used in the description or the claims means "a or b or c or any combination of these elements." For example, this terminology may include a, or b, or c, or a and b, or a and c, or a and b and c, or 2a, or 2b, or 2c, or 2a and b, and so on.

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

While the foregoing disclosure shows illustrative aspects, it should be noted that various changes and modifications could be made herein without departing from the scope of the appended claims. The functions, steps or actions of the method claims in accordance with aspects described herein need not be performed in any particular order unless expressly stated otherwise. Furthermore, although elements may be described or claimed in the singular, the plural is contemplated unless limitation to the singular is explicitly stated.

What is claimed is:

1. A method of communication for an apparatus, comprising:
    maintaining a mapping between indications and configurations of a first subset of a set of system information;
    receiving at least one indication;
    determining, based on the mapping and the received at least one indication, at least one valid configuration of the first subset of system information;
    receiving a second subset of the set of system information
    maintaining a mapping between indications and public land mobile networks (PLMNs);
    receiving at least one other indication;
    determining, based on the mapping and the received at least one other indication, at least one public land mobile network (PLMN) with which communication can be established; and
    establishing communication with another apparatus associated with the determined at least one PLMN,
    wherein the second subset of system information is received from the other apparatus after establishing the communication.

2. The method of claim 1, further comprising: receiving the mapping from a network entity.

3. The method of claim 1, wherein the mapping is preconfigured in the apparatus.

4. The method of claim 1, wherein the at least one indication is received via a physical broadcast channel.

5. The method of claim 1, further comprising:
    establishing communication with another apparatus according to the at least one valid configuration of the first subset of system information,
    wherein the second subset of system information is received from the other apparatus after establishing the communication.

6. The method of claim 1, further comprising:
    determining that system information maintained at the apparatus has changed or has expired; and
    sending a request for additional system information as a result of the determination.

7. The method of claim 1, further comprising:
    determining that a physical layer configuration has changed or has expired; and
    sending a request for additional system information as a result of the determination.

8. A method of communication for an apparatus, comprising:
    maintaining a mapping between indications and configurations of a first subset of a set of system information;
    receiving at least one indication;
    determining, based on the mapping and the received at least one indication, at least one valid configuration of the first subset of system information;
    receiving a second subset of the set of system information
    maintaining a mapping between indications and public land mobile networks (PLMNs);
    receiving at least one other indication;
    determining, based on the mapping and the received at least one other indication, at least one public land mobile network (PLMN) with which communication can be established; and
    establishing communication with another apparatus associated with the determined at least one PLMN,
    wherein the second subset of system information is received from the other apparatus after establishing the communication, and
    wherein the at least one other indication is mapped to at least one physical configuration parameter.

9. The method of claim 8, further comprising:
    receiving the mapping from a network entity.

10. The method of claim 8, wherein the mapping is preconfigured in the apparatus.

11. The method of claim 8, wherein the at least one indication is received via a physical broadcast channel.

12. The method of claim 8, further comprising:
    establishing communication with another apparatus according to the at least one valid configuration of the first subset of system information,
    wherein the second subset of system information is received from the other apparatus after establishing the communication.

13. The method of claim 8, further comprising:
    determining that system information maintained at the apparatus has changed or has expired; and
    sending a request for additional system information as a result of the determination.

14. The method of claim 8, further comprising:
    determining that a physical layer configuration has changed or has expired; and
    sending a request for additional system information as a result of the determination.

* * * * *